(12) United States Patent
Granot et al.

(10) Patent No.: US 11,567,787 B2
(45) Date of Patent: Jan. 31, 2023

(54) USER INTERFACE COLLABORATION ADVISOR

(71) Applicants: Ilan Yehuda Granot, Fremont, CA (US); Zvi Or-Bach, Haifa (IL)

(72) Inventors: Ilan Yehuda Granot, Fremont, CA (US); Zvi Or-Bach, Haifa (IL)

(73) Assignee: Or-Ment LLC, San Jose, CA (US)

( * ) Notice: Subject to any disclaimer, the term of this patent is extended or adjusted under 35 U.S.C. 154(b) by 0 days.

(21) Appl. No.: 17/486,918

(22) Filed: Sep. 28, 2021

(65) Prior Publication Data
US 2022/0012073 A1    Jan. 13, 2022

Related U.S. Application Data

(63) Continuation-in-part of application No. 17/076,378, filed on Oct. 21, 2020, now Pat. No. 11,157,294, (Continued)

(51) Int. Cl.
*G06F 9/451* (2018.01)
*H04L 67/10* (2022.01)
(Continued)

(52) U.S. Cl.
CPC ............ *G06F 9/451* (2018.02); *G06F 3/0481* (2013.01); *G06F 16/285* (2019.01); *H04L 67/10* (2013.01); *H04L 67/535* (2022.05)

(58) Field of Classification Search
CPC ...... G06F 9/451; G06F 16/285; G06F 3/0481; H04L 67/10; H04L 67/535
See application file for complete search history.

(56) References Cited

U.S. PATENT DOCUMENTS 5,508,718 A * 4/1996 Haikin ................. G06T 11/001
                                                    345/601
5,550,971 A * 8/1996 Brunner ............ G06F 16/24552
(Continued)

FOREIGN PATENT DOCUMENTS

WO    WO2016090326 A1 * 12/2014 ............. G06F 17/30

*Primary Examiner* — Nicholas Augustine
(74) *Attorney, Agent, or Firm* — Patent PC www.patentPC.com; Bao Tran

(57) ABSTRACT

A server system including: a memory processor including memory; a communication link, where the memory includes prior user interface experience records (PUIER), and where each PUIER represents a user interaction with a software tool's user interface screens; a first program designed to categorize user interface experience into at least two groups, where the two groups include an experienced users and an inexperienced users group, the experienced users group includes individual experienced users, and each one of the individual experienced users demonstrates a better than average proficiency of the user software tool; a second program designed to construct a user interface experience graph from the experienced users group's interface experience with the software tool; a third program using the user interface experience graph to communicate analytics to at least one external destination, the analytics are in respect to the experienced users group's interface experience with the software tool.

20 Claims, 32 Drawing Sheets

Related U.S. Application Data which is a continuation of application No. 16/573,667, filed on Sep. 17, 2019, now Pat. No. 10,846,105.

(60) Provisional application No. 62/739,213, filed on Sep. 29, 2018.

(51) Int. Cl.
  *G06F 3/0481* (2022.01)
  *G06F 16/28* (2019.01)
  G06F 9/44 (2018.01)
  H04L 67/50 (2022.01)

(56) References Cited

U.S. PATENT DOCUMENTS

| | | | |
|---|---|---|---|
| 5,604,860 A * | 2/1997 | McLaughlin | G03G 15/502 715/810 |
| 5,611,059 A * | 3/1997 | Benton | G05B 19/0426 715/965 |
| 5,673,401 A * | 9/1997 | Volk | H04N 21/42204 348/E7.071 |
| 5,726,883 A * | 3/1998 | Levine | H04N 1/00503 700/83 |
| 5,754,174 A * | 5/1998 | Carpenter | G06F 3/0481 715/810 |
| 5,832,496 A * | 11/1998 | Anand | G06F 16/248 707/E17.118 |
| 5,870,088 A * | 2/1999 | Washington | G06F 9/451 707/999.102 |
| 5,956,024 A * | 9/1999 | Strickland | G06Q 30/02 715/717 |
| 6,014,138 A * | 1/2000 | Cain | G06F 8/24 715/744 |
| 6,137,485 A * | 10/2000 | Kawai | H04N 7/15 348/E7.083 |
| 6,144,962 A * | 11/2000 | Weinberg | G06F 11/32 714/E11.181 |
| 6,199,099 B1 * | 3/2001 | Gershman | G06F 16/9537 709/201 |
| 6,212,524 B1 * | 4/2001 | Weissman | G06F 16/283 707/769 |
| 6,222,540 B1 * | 4/2001 | Sacerdoti | G06T 11/206 345/440.1 |
| 6,275,225 B1 * | 8/2001 | Rangarajan | G06F 9/451 715/969 |
| 6,330,007 B1 * | 12/2001 | Isreal | G06F 8/38 715/764 |
| 6,353,446 B1 * | 3/2002 | Vaughn | H04L 41/22 715/733 |
| 6,356,905 B1 * | 3/2002 | Gershman | G06F 16/957 707/999.005 |
| 6,377,993 B1 * | 4/2002 | Brandt | H04L 41/5022 709/227 |
| 6,601,233 B1 * | 7/2003 | Underwood | G06F 8/24 717/102 |
| 6,621,508 B1 * | 9/2003 | Shiraishi | G06F 3/0481 715/764 |
| 6,643,661 B2 * | 11/2003 | Polizzi | G06F 16/958 707/711 |
| 6,668,253 B1 * | 12/2003 | Thompson | G06Q 10/06 |
| 6,678,634 B1 * | 1/2004 | Wendt | B21B 38/04 702/170 |
| 6,714,219 B2 * | 3/2004 | Lindhorst | G06F 8/34 715/769 |
| 6,748,394 B2 * | 6/2004 | Shah | G06F 21/6218 707/999.102 |
| 6,757,681 B1 * | 6/2004 | Bertram | H04L 43/045 707/999.102 |
| 6,792,475 B1 * | 9/2004 | Arcuri | H04L 9/40 715/239 |
| 6,832,263 B2 * | 12/2004 | Polizzi | G06F 16/954 707/999.101 |
| 6,889,096 B2 * | 5/2005 | Spriggs | G05B 19/19 705/28 |
| 6,895,409 B2 * | 5/2005 | Uluakar | G06F 8/20 717/121 |
| 6,918,091 B2 * | 7/2005 | Leavitt | G06F 9/451 715/779 |
| 6,941,311 B2 * | 9/2005 | Shah | G06F 21/6218 707/999.102 |
| 6,947,929 B2 * | 9/2005 | Bruce | G06F 16/24575 707/999.005 |
| 6,990,520 B2 * | 1/2006 | Green | H04L 41/0873 709/224 |
| 7,007,029 B1 * | 2/2006 | Chen | G06F 16/283 |
| 7,030,890 B1 * | 4/2006 | Jouet | G06F 9/451 345/589 |
| 2002/0054141 A1 * | 5/2002 | Yen | G09G 5/14 715/804 |
| 2002/0095651 A1 * | 7/2002 | Kumar | H04L 67/567 707/E17.119 |
| 2002/0123915 A1 * | 9/2002 | Denning | G06Q 10/06 705/7.11 |
| 2002/0138158 A1 * | 9/2002 | Landreth | G05B 15/02 714/1 |
| 2002/0138527 A1 * | 9/2002 | Bell | G06Q 10/10 715/255 |
| 2002/0186257 A1 * | 12/2002 | Cadiz | G06F 16/9535 715/838 |
| 2003/0020671 A1 * | 1/2003 | Santoro | G09G 5/14 345/1.3 |
| 2003/0023468 A1 * | 1/2003 | Aurrichio | G06Q 10/10 705/7.38 |
| 2003/0030664 A1 * | 2/2003 | Parry | G06F 9/4411 715/744 |
| 2003/0120711 A1 * | 6/2003 | Katz | H04L 67/75 718/106 |
| 2003/0164862 A1 * | 9/2003 | Cadiz | G06Q 10/107 715/838 |
| 2003/0233367 A1 * | 12/2003 | Uluakar | G06F 8/36 707/999.102 |
| 2004/0015783 A1 * | 1/2004 | Lennon | G06F 16/248 715/255 |
| 2004/0181543 A1 * | 9/2004 | Wu | G06F 16/90328 707/999.102 |
| 2004/0205287 A1 * | 10/2004 | Joder | G06Q 10/06 711/1 |
| 2005/0015745 A1 * | 1/2005 | Wain | G06F 8/34 717/109 |
| 2005/0022160 A1 * | 1/2005 | Uluakar | G06F 8/36 717/105 |
| 2005/0050095 A1 * | 3/2005 | Hurtis | G06Q 10/06 |
| 2005/0069107 A1 * | 3/2005 | Tanaka | H04N 7/142 348/E7.079 |
| 2005/0071305 A1 * | 3/2005 | Hugh | G06F 16/30 706/45 |
| 2006/0020942 A1 * | 1/2006 | Ly | G06F 9/5027 718/100 |

* cited by examiner

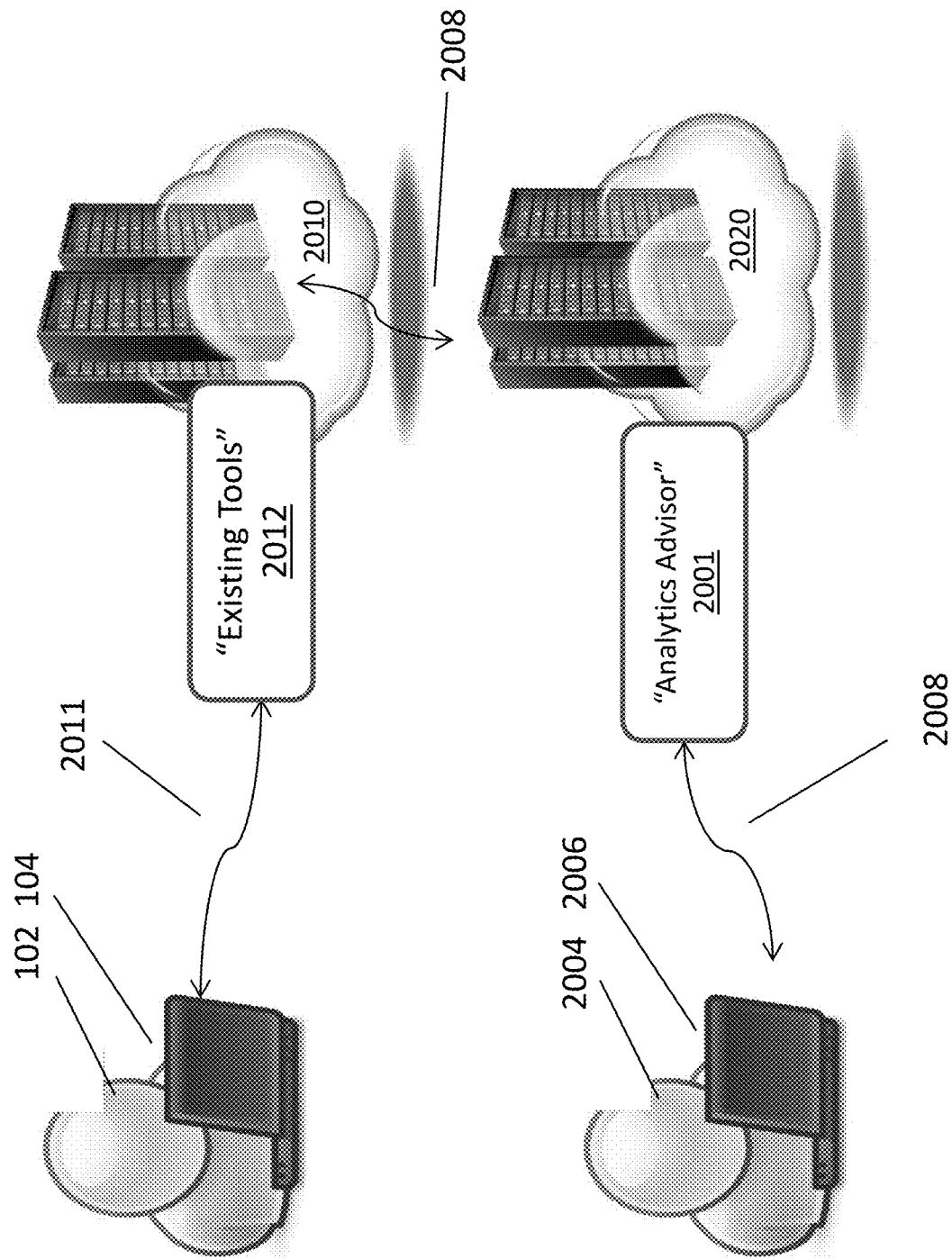

USER INTERFACE COLLABORATION ADVISOR

CROSS-REFERENCE OF RELATED APPLICATIONS

This application is a Continuation In Part of U.S. patent application Ser. No. 17/076,378, filed on Oct. 21, 2020, which is a CONtinuation of U.S. patent application Ser. No. 16/573,667, filed on Sep. 17, 2019 and is now U.S. Pat. No. 10,846,105 issued on Nov. 24, 2020, which claims the benefit of U.S. provisional application 62/739,213, which was filed on Sep. 29, 2018. The entire contents of the foregoing applications and patents are incorporated herein by reference.

BACKGROUND OF THE INVENTION

More and more people are interacting with computer based applications. In many cases these interaction are not routine, but rather very occasional. Hence, the users may not know or remember all of the common commands, etc. for the use of a specific computer based application. While these applications are designed to be friendly for their users, some users face difficulties and their interactions with some of these applications are time consuming and frustrating.

SUMMARY

The invention includes a reporting module resident in the user unit or in the software application ("SW") or in the platform running the software application, which is reporting the user's interaction with an application to the Advisor system which could be a cloud based system. The Advisor aggregates these user's interaction records and selects those records that are considered from an 'experienced' users to form 'learning'. Then it constructs advice to be offered to inexperienced users as they engage and interact with the application ("SW").

In one aspect, a server system, the server system comprising: a memory processor comprising memory; a communication link, wherein said memory comprises a plurality of prior shoppers interface experience records, and wherein each of said prior shoppers interface experience records represent a shoppers interaction with a plurality of shopping interface screens of a shopping tool; a first program designed to categorize shoppers interface experience into at least two groups, wherein said at least two groups comprise an experienced shoppers group and an inexperienced shoppers group, wherein said experienced shoppers group comprises individual experienced shoppers, and wherein each one of said individual experienced shoppers demonstrates a better than average proficiency of said shopping tool; a second program designed to construct a shopper interface experience graph from said experienced shoppers group's interface experience with said shopping tool; and a third program designed to use said shopper interface experience graph to communicate suggestion notes to at least one shopper of said shopping tool, wherein said suggestion notes are designed to help said at least one shoppers interface with said shopping tool.

In another aspect, a server system, the server system comprising: a memory processor comprising memory; a communication link, wherein said memory comprises a plurality of prior user interface experience records, and wherein each of said prior user interface experience records represent a user interaction with a plurality of user interface screens of a social media site; a first program designed to categorize user interface experience into at least two groups, wherein said at least two groups comprise an experienced users group and an inexperienced users group, wherein said experienced users group comprises individual experienced users, and wherein each one of said individual experienced users demonstrates a better than average proficiency of said user in said social media site; a second program designed to construct a user interface experience graph from said experienced users group's interface experience with said social media site; and a third program designed to use said user interface experience graph to communicate suggestion notes to at least one user of said social media site, wherein said suggestion notes are designed to help said at least one user interface with said social media site.

In another aspect, a server system, the server system comprising: a memory processor comprising memory; a communication link, wherein said memory comprises a plurality of prior user interface experience records, and wherein each of said prior user interface experience records represent a user interaction with a plurality of user interface screens of a software tool; a first program designed to categorize user interface experience into at least two groups, wherein said at least two groups comprise an experienced users group and an inexperienced users group, wherein said experienced users group comprises individual experienced users, and wherein each one of said individual experienced users demonstrates a better than average proficiency of said user software tool; a second program designed to construct a user interface experience graph from said experienced users group's interface experience with said software tool; and a third program designed to use said user interface experience graph to communicate analytics to at least one external destination, wherein said analytics are in respect to said experienced users group's interface experience with said software tool.

BRIEF DESCRIPTION OF THE DRAWINGS

Various embodiments of the invention could be understood and appreciated more fully from the following detailed description, taken in conjunction with the drawings in which:

FIGS. 5A-5B are examples of a software screen "SW" with suggestions with possible desired end goals;

FIGS. 8A-8C are examples of learning and suggestions when entering user specific data;

FIGS. 9A-9C are examples of learning a general action from user specific entries and suggestions formed by this learning;

FIGS. 20A, 20B, and 20C are additional example illustrations of the overall system.

DETAILED DESCRIPTION

Figure 1:
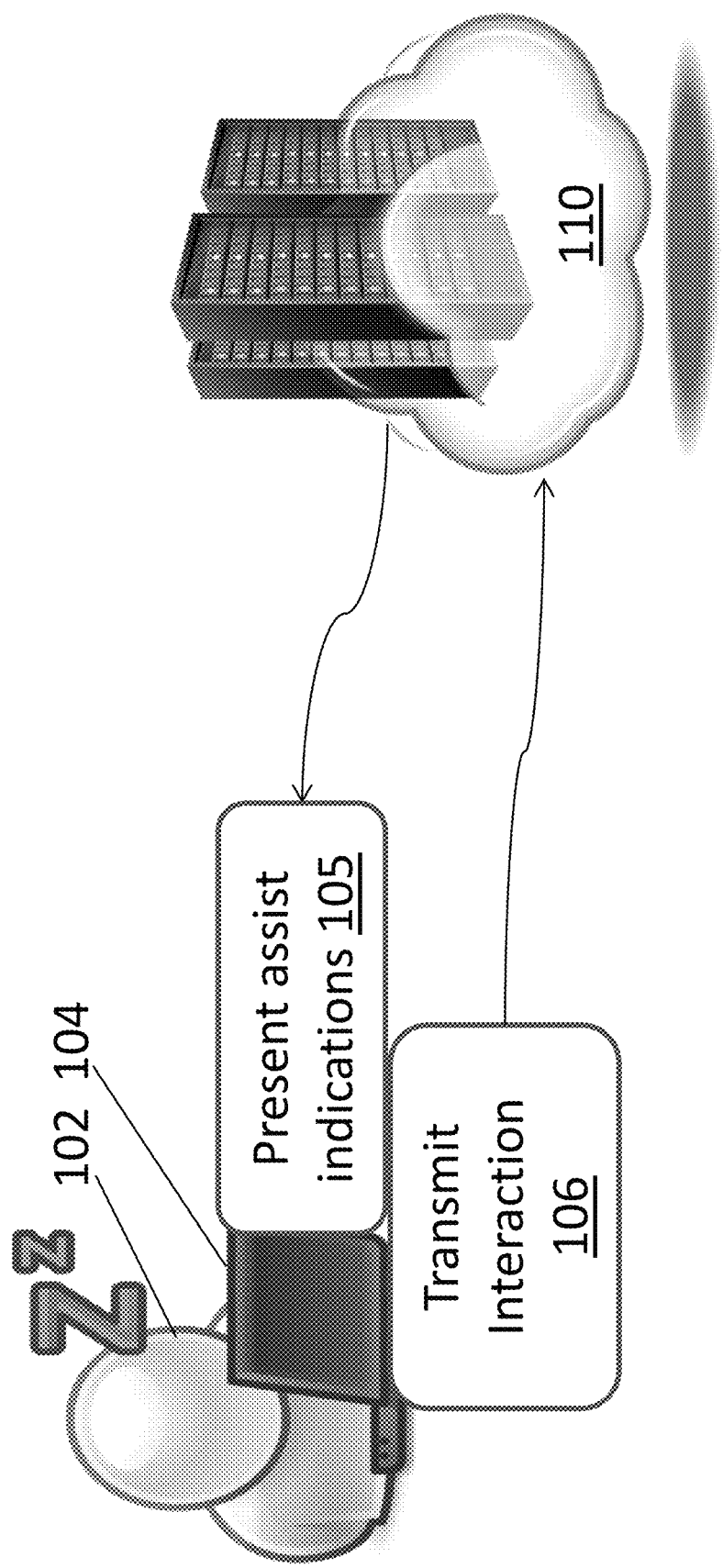
FIG. 1 is an example illustration of the overall system.

Embodiments of the invention are described herein with reference to the drawing figures. Persons of ordinary skill in the art could appreciate that the description and figures illustrate rather than limit the invention and that in general the figures are not drawn to scale for clarity of presentation. Such skilled persons could also realize that many more embodiments are possible by applying the inventive principles contained herein and that such embodiments fall within the scope of the invention which is not to be limited except by the appended claims.

FIG. 1 illustrates the overall system. A user 102 is interacting with an application, ("SW") using his computer 104. Two software tools are installed on the user computer 104. These tools could be also installed on the computer serving the SW such if the SW is Web based or other form of remote service (Server, Cloud, . . . ). A first tool Interaction Transmitter 106 which monitors user interactions via the tracking the software functions or the computer's mouse and keyboard and transmits them to the cloud computer to the UI (User Interface) Advisor 110 ("Advisor"), and a second tool, the Assistor 105, which is designed to helps the user with his effort to use the SW. It should be noted that while in here a description is made using a specific system architecture, these are done to simplify the description. An artisan in the art could know how to apply these concepts to other alternative system architectures such as specific dedicated server, tool that could be resident in the same tool that the SW is running on and so forth. The help could include indications of the most popular choices made by prior experienced users and examples of how other users had filled various data entries requested by the application. The Assistor's 105 hints could pop-up on the computer screen once the user moves the cursor near a field of requested data entry by the application.

Additional option in the case of a SW being used on external computer such as server, is to track user interactions with the SW, by using a server-side tracking module instead of a client-side Interaction Transmitter 106. The server-side tracking could track the user's operations through monitoring the functions that are executed on the server computer due to the user's interaction of a session. For example, a user that filled in a form such as in FIG. 8A could have his input data received by the server and the user could be then sent to a next page. These operations performed by the server of storing the user input and sending the user's device to a next screen could be recorded by the system for learning. The Present assist ("Assistor") 105 could also be operating on the server side and forward to the user screen accordingly.

The interaction Transmitter 106 could first transmit to the cloud for the UI Advisor 110, the specifics of the application and the specifics of the computing system such as the operating system or the browser being used and then transmit each of the choices made by the user using his mouse and keyboard or touch if such is used. This data upload does not need to include identifying or private information in respect to the user, as the information in the cloud could not need to be traceable back to the specific user.

In the cloud, completed sessions that had been received are stored in successful interactions file. Completed sessions are defined per specific application, for example if the application is an airline passenger check-in, then the system producing a Boarding Card could be considered completion of that specific application transaction. An end of a session may include closing the specific application. The UI Advisor 110 could then categorize sessions into at least two groups. Sessions that are done by 'experienced' users, and sessions that are done by 'inexperienced' users. The users' screening could be according to few criteria, such as, an 'experienced' user is one that completed:

a. A session which took a shorter time than the average session.

b. A session which had fewer 'back steps' than the average session.

The following step in the UI Advisor 110 could be the learning. The learning process may include forming an Experience Graph 302 of FIG. 3. Experience graph 302 could be structured so that each node represents a possible display screen of the application. An edge from a node represents a transition to another node as a result of an input from the user, using the mouse and/or the keyboard or 'touch'. The attribute associated with such edge between node could represent the probability such transition was used by the 'experienced' users.

The Experience Graph 302 data may then be transmitted to the Assistor 105 to help future users (or follow-on sessions of the same user) with the SW. The Assistor 105 could then indicate for every node the popular choice made by prior 'experienced' users, and could present pop up examples for specific fields of how 'experienced' users had clicked or filled them. The Assistor could include a detector for a user that exceeded the average time or number of recurring actions to trigger the pop up example.

The Transmitter 106 tool could include privacy protection so that no name, address or any personal data is being transmitted. Such could be achieved by a utility which transmits a repeat of the first letter for each following letter and the same number for each following number. Alternatively it could use 'X' for capital letter 'x' for normal letter, 9 for number and so forth.

Figure 2A:
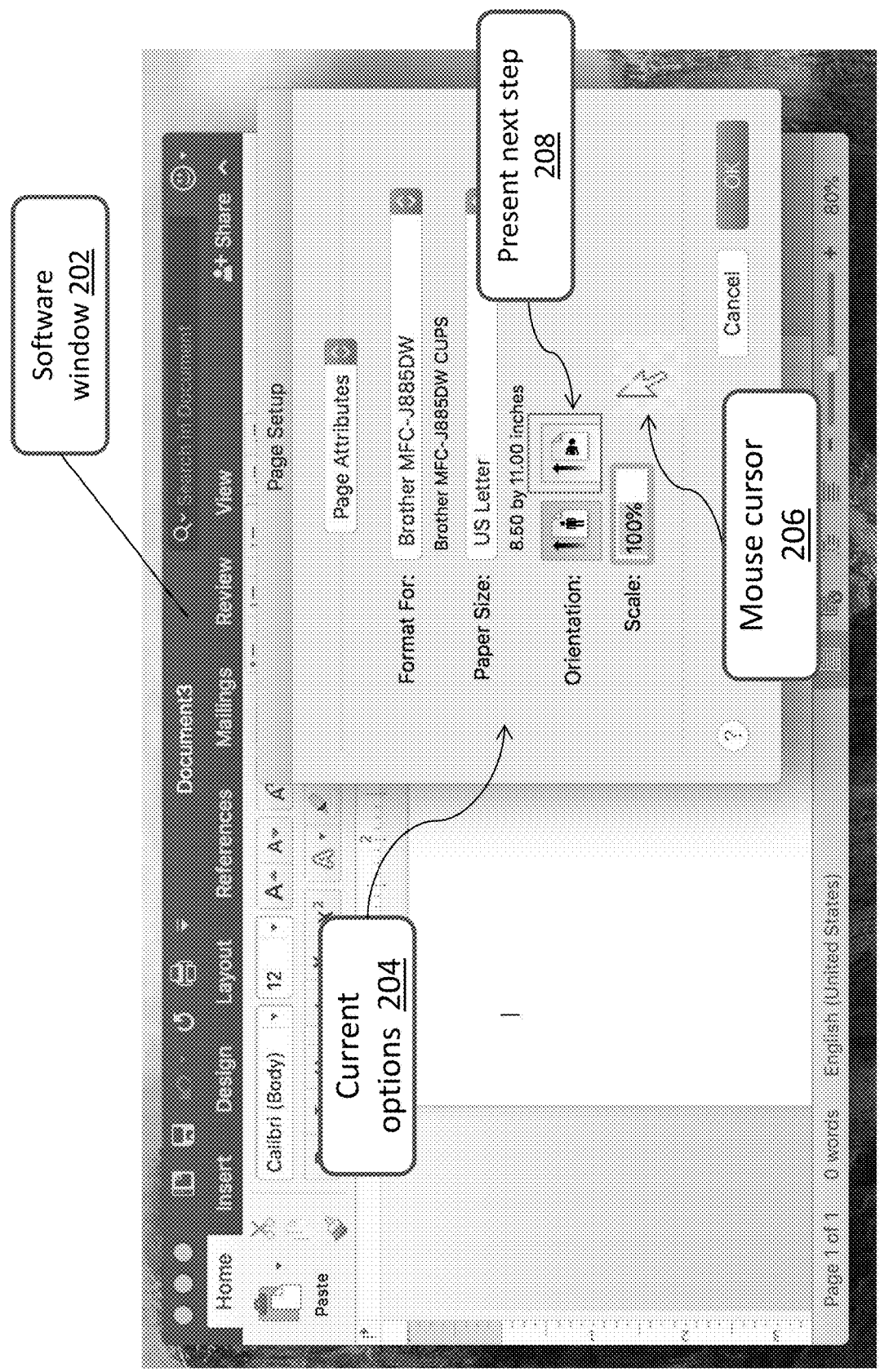
FIGS. 2A-2B are example illustrations of a software screen with choices.

FIG. 2A illustrates an example display screen for an application such as setting the page attribute of a printer. This application, for example, could be a sub-application of the windows Word application software window 202. The application screen may display current options 204 of the specific node and the position of the Mouse curser 206 controlled by the computer mouse relative to other elements on the screen and the indication for the choice to transition to the next node present next step 208.

Figure 2B:
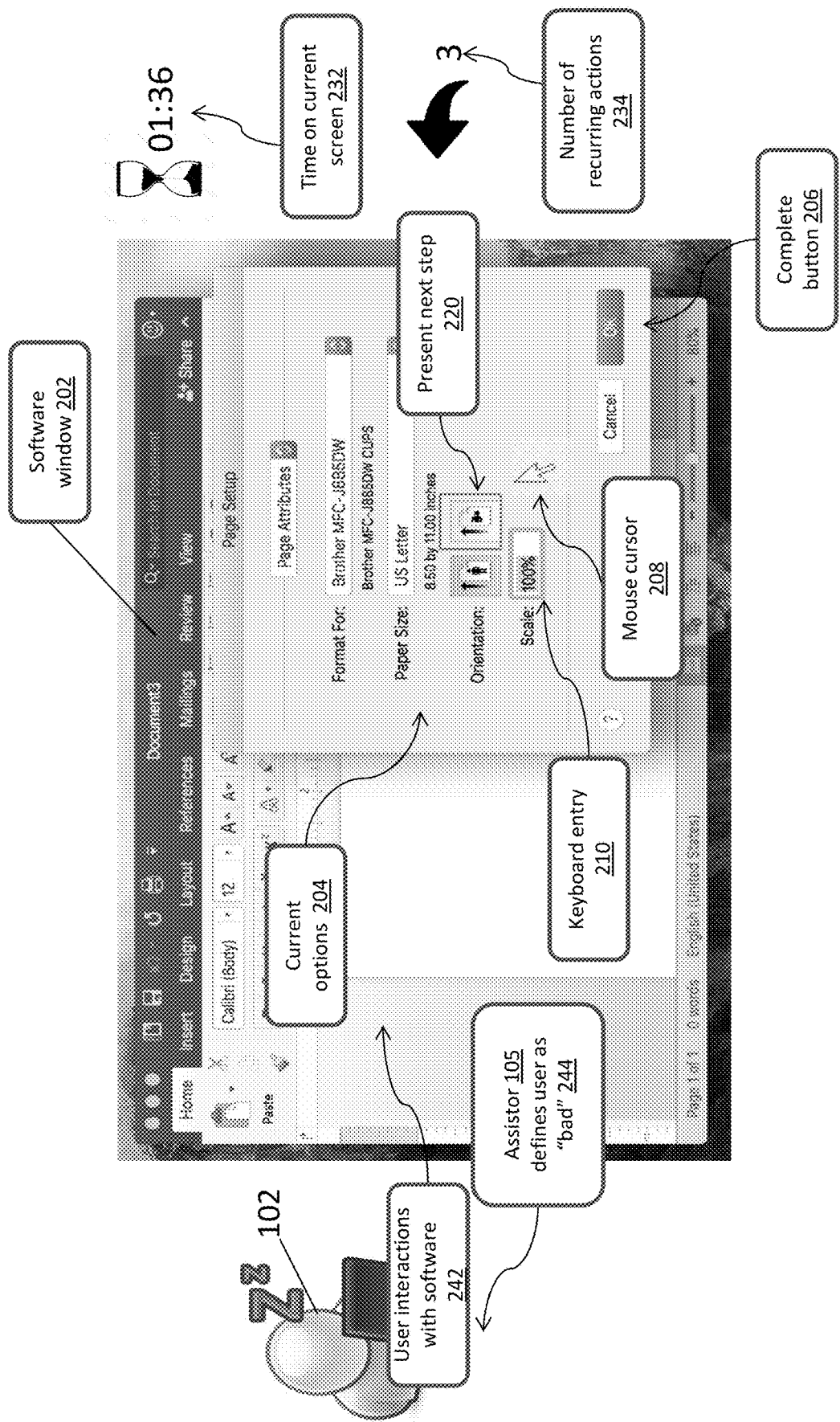

FIG. 2B illustrates additional indications that could be tracked by Transmitter 106. For example, a keyboard entry 210, the time the user has already been on the specific screen 232, the number of recurring actions 234, and choices that could be added by Assistor 105 such as a suggestion for a next step 220, and a key choice to complete the session 206 of software window 202.

Figure 3:
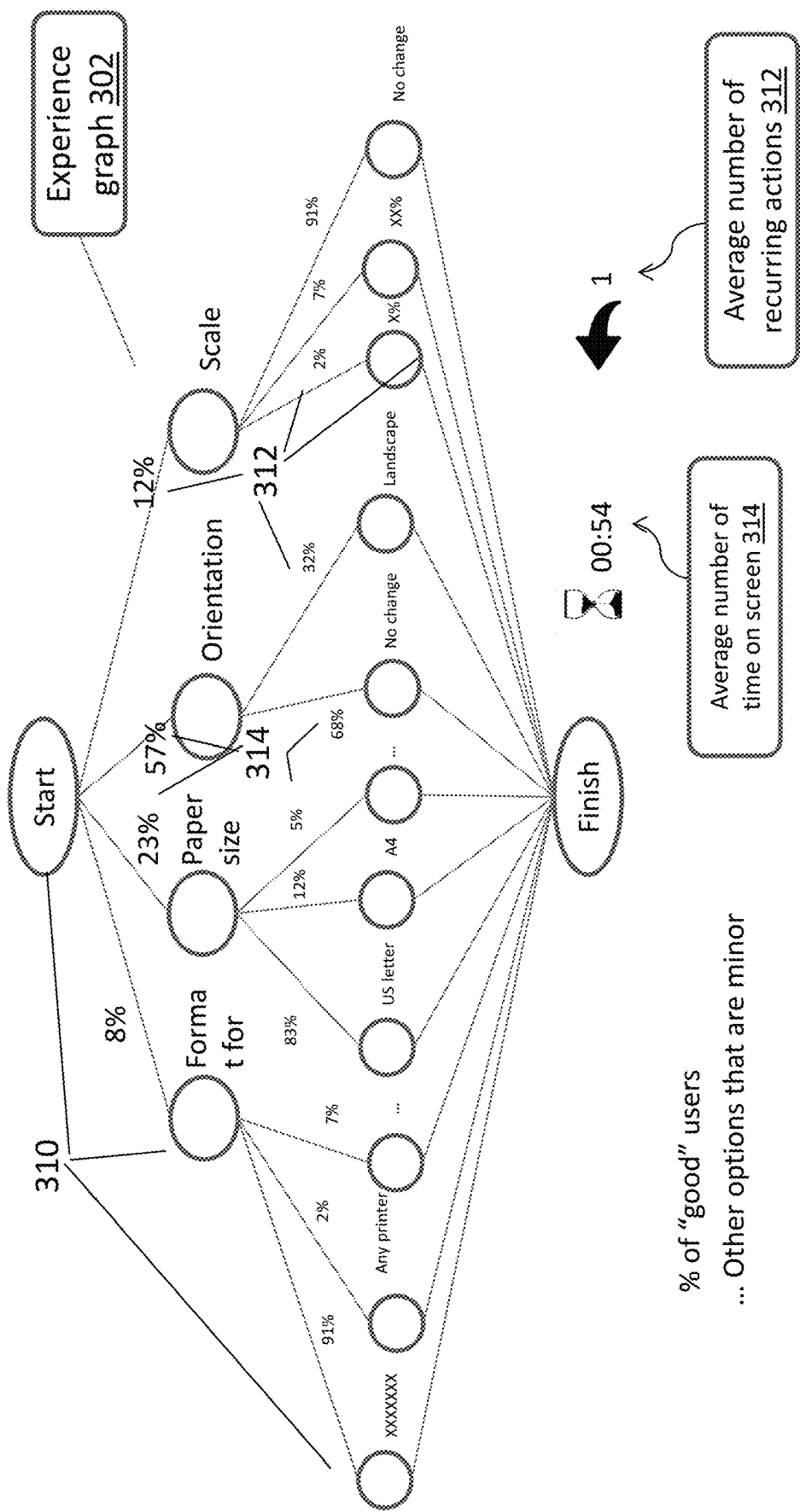
FIG. 3 is an example illustration of an experience graph.

FIG. 3 illustrates an example of an Experience Graph 302 for a Printing. It illustrates the common 'nodes' for this application. Also, Experience Graph 302 presents previous experienced user choices of nodes as percent indicators for the relevant edges. In addition the average number of 'experienced' users recurring actions 312 and their average amount of time on screen 314 may be calculated and presented.

The UI Advisor 110 could include a continuous learning mode in which additional users experience is added in. The addition of a new experience could be designated the same 'weight' as an old experience, and could be calculated as follows:

$AV_n$ represent the average of 'n' old 'experienced' users
$AV_m$ represent the average of 'm' new 'experienced' users $$=>AV(n+m)=(n*AV_n+m*AV_m)/(n+m)$$

Other forms of continuous learning could be used in which old data has less 'weight' then new data. These and other types of statistics calculation could be designed by an artisan in the art.

The selection of 'experienced' users could account for the choices they had made in using the application. This could be important for more complex applications in which early choices could result in longer average completion times than other choices. As an example a SW might have an introductory tutorial to help inexperienced users. A choice of user to go through the introductory tutorial could indicate him being an "inexperienced" user.

The UI Advisor 110 could include a module to help the Application developer. Such learning could be guided by the 'inexperienced' users-experience ("UX") and their 'weak' choices that are associated with their sessions. The application developer could later release updates for the application in an effort to reduce the probability for these 'weak' choices.

It could be useful if the most popular elements could appear first in different screens of the SW. Thus, another option is that the system could perform an automatic structuring of the screens of the SW. This could be done by having a module on the computer that sorts the elements that are displayed on the user screen by their "experienced users" usage popularity, and then arranging them so they could appear in that order. For example, the system could change the structure of a form such that it could display its fields by their order of popularity from top to bottom. And, could change the order of the top menu items so that they could be displayed by their order of popularity, for example, from left to right. Furthermore, the software could have more than one display state. For example, one mode for "inexperienced" users which could display less options on the screen, whereas the "experienced" users could see all the options. These modes could also have a button on the screen to manually switch between modes.

Figure 4:
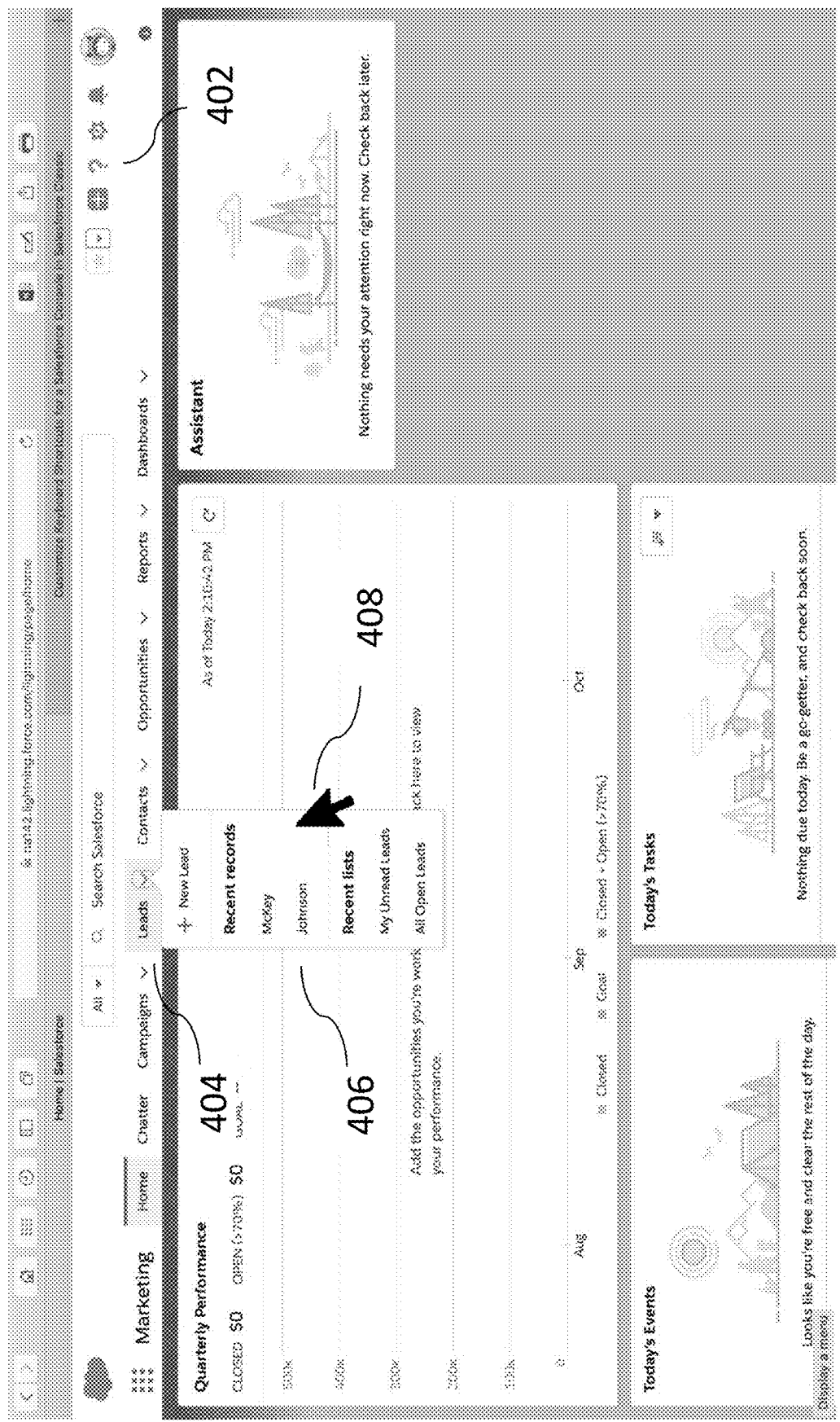
FIG. 4 is an example of software screen "SW" with the user stays idle hovering over a menu item.

There are few parameters that could be used to categorize a user as "experienced" or "inexperienced". If the user's parameters are better or equal to the average then he is considered 'experienced', otherwise he is considered 'inexperienced'. As illustrated in FIG. 4, we use the well-known software platform Salesforce.com which is an example of an online application software ("SW"). We measure the following parameters of a user using the SW: The elapsed time between when the page has finished loading and the first interaction (keyboard input or mouse click) of the user. The elapsed time between the interactions with the elements shown on his screen. The time it took a user to complete a screen (or a form), for example, the system can detect when the user's browser is directed to another screen of the SW. The elapsed time it has taken the user to complete a known path of screens in the SW to achieve an objective.

The system could also take into consideration the case where the user has switched to a different program or window and in such case the elapsed time could stop counting and could resume counting once the SW window or screen could become 'in-focus' again. Such a situation can be detected, for example, when the SW screen or window is not defined as 'in focus' by the browser.

An additional inventive embodiment could be the option to detect when a user is not using the SW, that is, the user is not "attendant", by tracking the mouse activity and keyboard inputs. This is done in order to pause the elapsed time in such a case. It is common that when a user does not know what to do his hand holding the mouse could still move as this occurs naturally. Thus, if no mouse movement or keyboard input is detected at all, then the elapsed time could pause. So, for example, a user that left his desktop computer for some time with the SW still open on the screen may not necessarily be detected as "inexperienced".

Furthermore, a user could be considered 'inexperienced' in at least the following cases: The user is going back and forth between screens of the SW without making selections or actions. When a user is scrolling up and down without making selections or actions. When a user uses a "help" function 402. When clicking 'menu' 404, or hovering with a mouse cursor 408 over 'menu-options' 406, but staying idle, that is without making further selections.

When the system detected the user as 'inexperienced' the system could activate an advisor action such as showing indicators on the user's screen, that is, it could show 'suggestions'. Such 'suggestions' could include a note 714 telling the user about the offered help, and could indicate, for example, with 'markers' 712, 716, 718 the most popular choices made by the 'experienced' users on that specific SW screen. Next to the option the system may indicate percentages 720, 722, 724 referencing the percentage of 'experienced' users which have chosen that option. In case the system 'learned' from 'experienced' users that it is needed to hover over an element in order to perform an action then it could show that step as a suggestion as well which may include text such as, for example, "hover over here" next to that suggestion. The suggestions could be the most popular branches that were pulled from an Experience Graph which correlates to that specific screen 726. This could be done while also taking into consideration other factors about the user such as the "path" that user traveled.

In addition, the system can use a user's prior characterization. So if a specific user has been characterized as an "experienced" user in the past than this user could be considered as "experienced" from now on. The user detection could be done, for example, with Cookies or the user's email, or some other form of ID. Furthermore, known information about the user may be, for example, the user's position in the company where working and this information can be considered in the learning process by relating that user to other known users which have the same position in a workplace. Consequently, the suggestions that could show on the user's computer may be, for example, emphasis on the choices that were made by 'experienced' users which has the same position as the user, or close to the same position.

Another option to achieve learning from 'experienced' users is that the system could use multilevel characterization. So each "experienced" user could get a score and the learning from "experienced" users could use weights according to their scores, so a high level 'experienced' user could have more effect than a low level 'experienced' user in the learning.

Figure 6A:
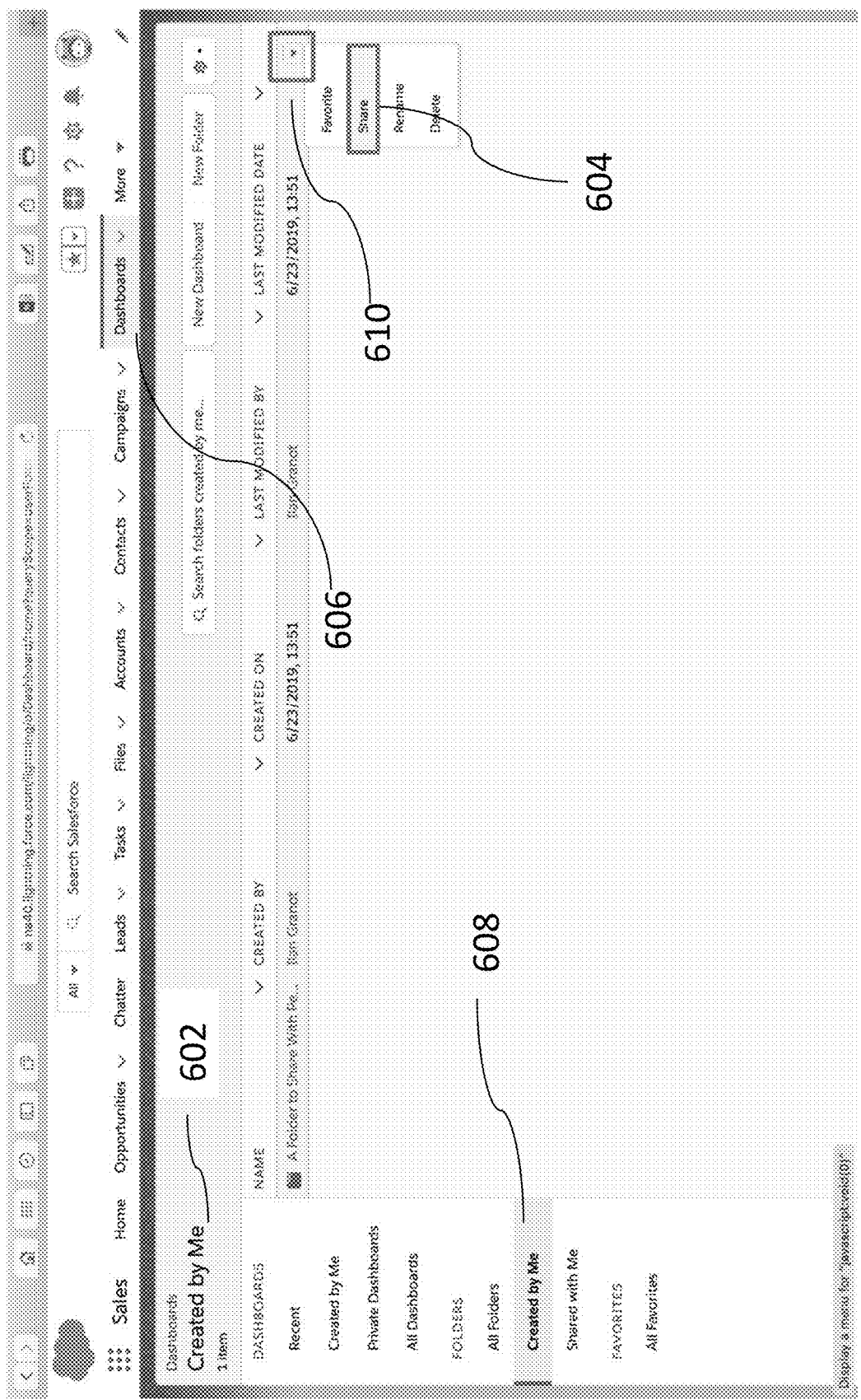
FIGS. 6A-6B are examples of a software screen "SW" with suggestions for possible desired actions, and a learning inference.
Figure 6B:
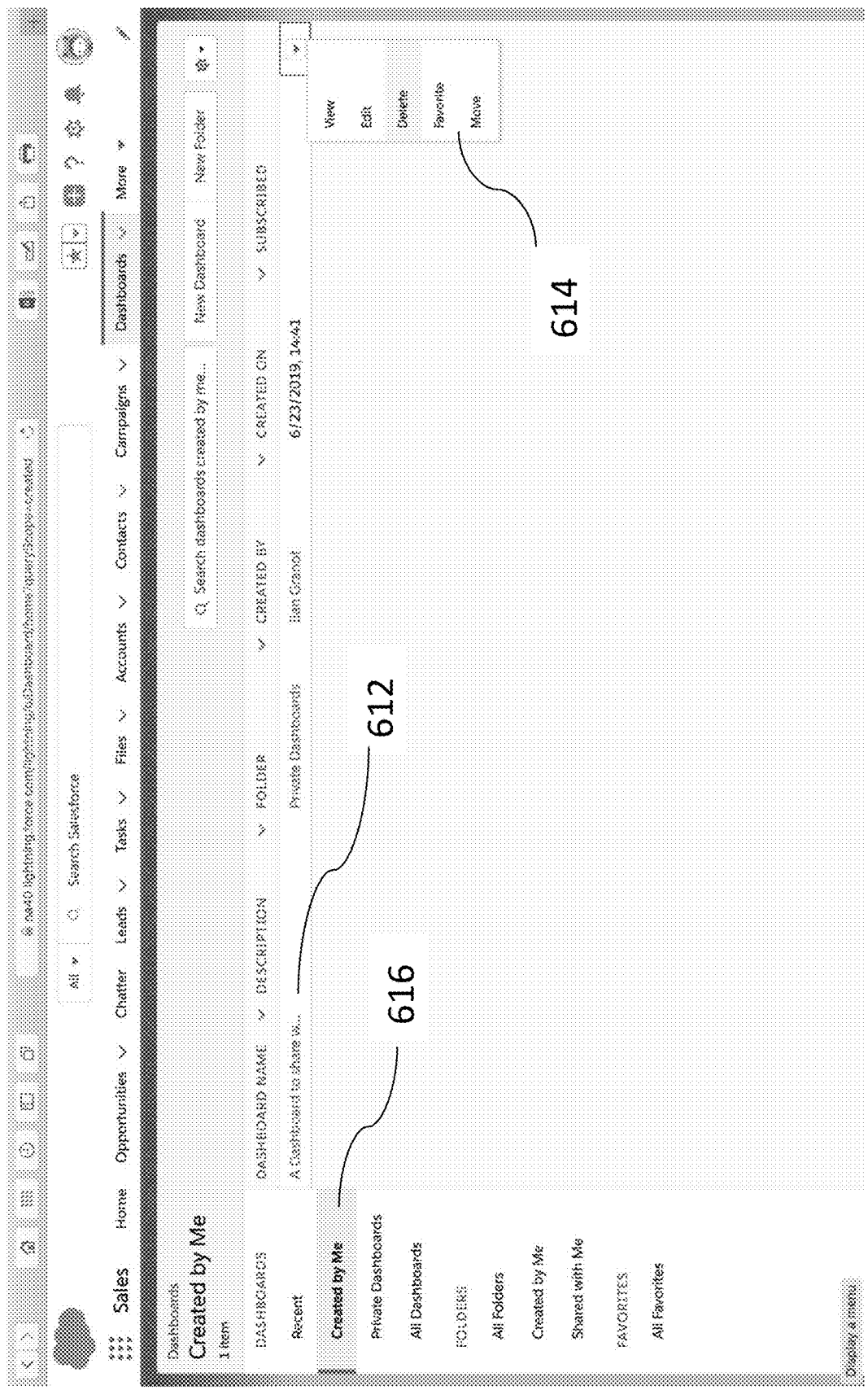
Figure 7:
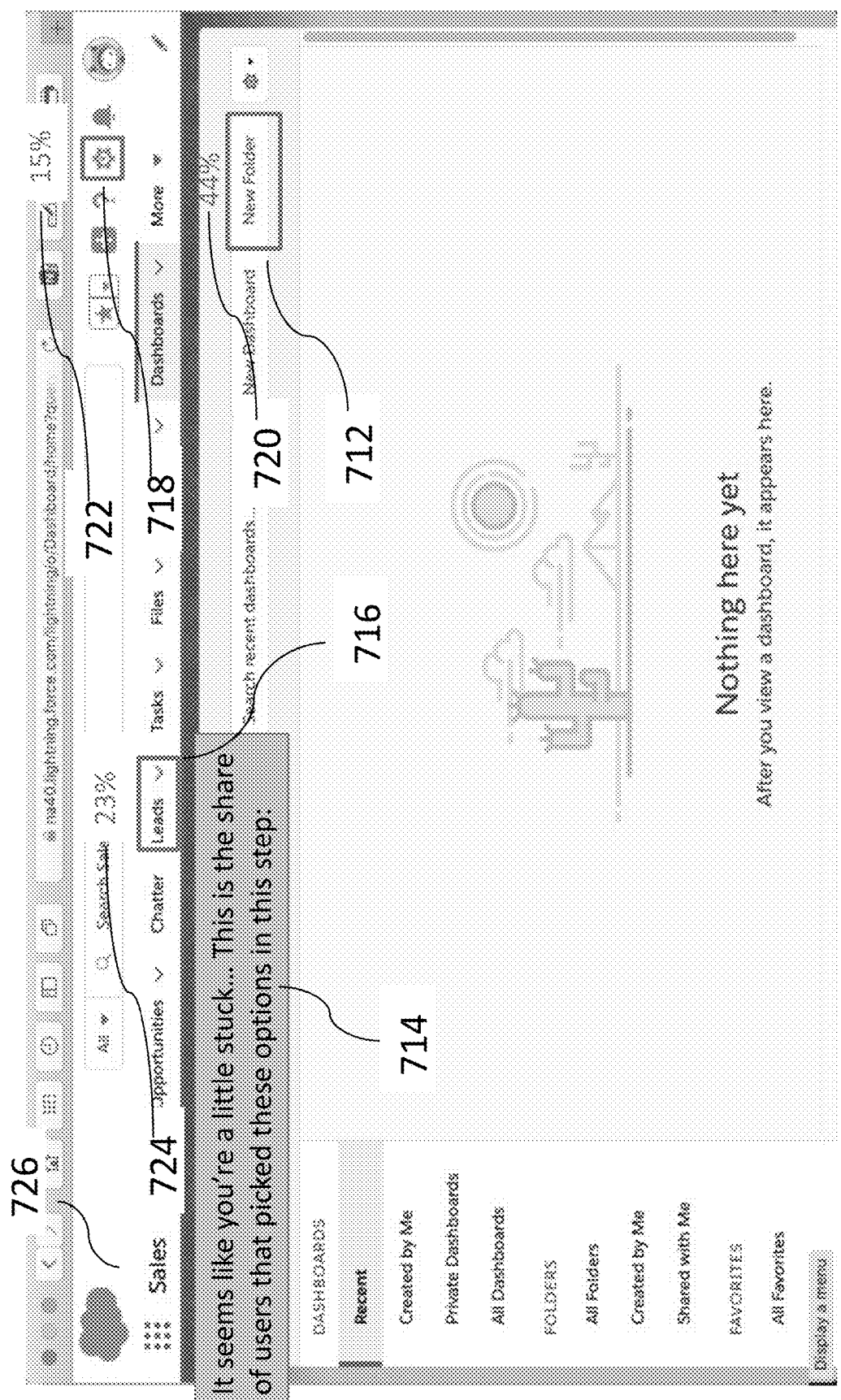
FIG. 7 is an example of software screen "SW" of suggestions with possible desired actions to click and a percentage associated with each suggestion.

Some of the problems which users encounter can be more complex. For example, there are cases when the user has a misconception about how to perform a certain process in order to achieve an objective in the SW. For these erroneous trials the system can "guess" the user's original intention and to suggest to the user possible desired "end-goals". Illustrated in FIG. 6B is an example of a SW screen where a user may like to share a 'dashboard' 612 that has been created by that same user 'Me' 616. Yet, 'Me' may not be able to do so because the SW does not have a 'share' option in the 'menu' 614 of that 'dashboard' entry. The problem here is that the user didn't perform the prerequisite steps that are needed for the sharing function of the 'dashboard' to work. The system could show to that user the correct sequence of operations, namely the following steps: to create a 'folder'—first, to move the 'dashboard' into it, and then to share that 'folder'. As explained in regards to FIG. 6A, the system could recommend the user to go to the "correct" screen—the first screen of the "popular path". Then the system could show the user, at each step, suggestions, such as, 610, 604 for the actions the user needs to perform in order to achieve that user's objective. The system could recognize that the user is on a "popular path", but that the user did not travel that "common path" from the "beginning of path". Thus, by detecting that the user's "traveled path" is a part of the "common path" of "share a dashboard" the Advisor could advise the user the "end-goal" as a suggestion.

Another type of problem that users could encounter could be solved by detecting when the user starts to perform the correct set of operations in order to achieve a desired goal, but at a certain step along the way that user stops and gets "stuck". This type of problem could be detected by recognizing that the user's "traveled path" started at the screen of a "beginning of path", of a "popular path", but did not reach the "end-goal" screen. The system could then show suggestions of possible "end-goals". These could be rendered from the "end-goals" of "popular paths" from the last node the user traveled with "branching out" 1120 of nodes, before the user got "stuck".

Figure 11:
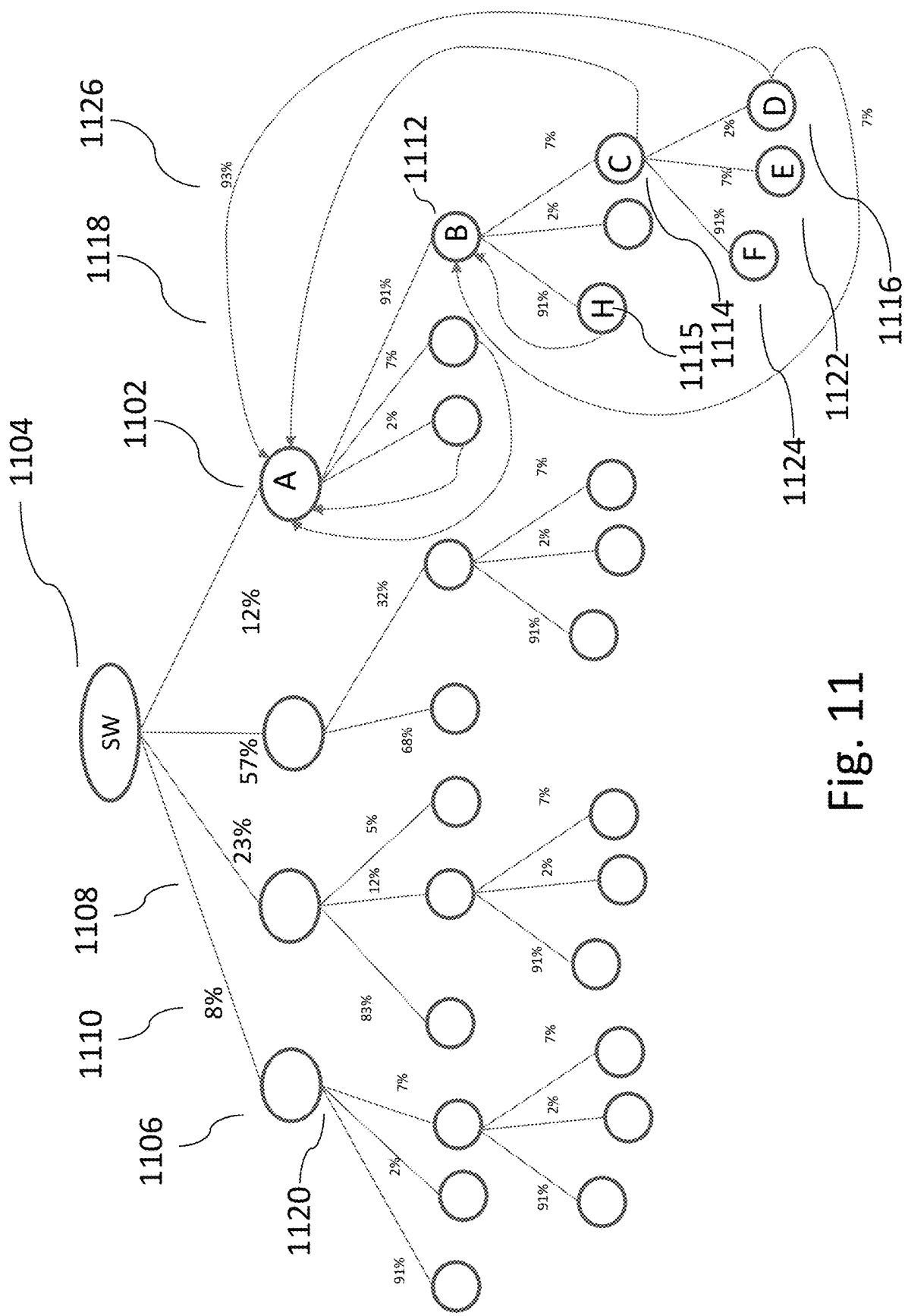
FIG. 11 is an example of an experience graph.

An additional inventive embodiment is to provide an option for the system to help users in the cases mentioned above to recognize "popular paths" which are sequences of screens of the SW. These experience graphs could be ones popular among "experienced" users, and could include the interactions they performed within them. Specifically, by forming learning of an "experience graph" of these paths as illustrated in FIG. 11 which branches out from the main screen 1104 of the SW. The nodes 1106 represent a specific screen, the branches 1108 represent transition from one screen to another screen as a result of the user action, and the percentage 1110 represent the percentage of "experienced" users who traveled along that branch. Specifically, the system could form learning of "popular paths" by grouping common paths of "experienced" users. For example, a path where there are 2 or more connected nodes, such as the path between node A 1102 and node D 1116. Thus, node A 1102, could be the 'beginning of path' and node D 1116, could be the 'end of path'. Thus "end of path" could be shown at the "beginning of path", or along a path as a possible suggestion.

Let us consider an "inexperienced" user who started an interaction from the screen of node 'B' 1112, and got "stuck" at the screen of node 'H' 1115. It means that the user is "stuck" somewhere in the middle of a "popular path", between node A 1102 and node 'D' 1116. In such a case the system could suggest the user the "end-goal" which is associated with node 'D' 1116, the "end-of-path" screen. If the user chooses that suggestion, the system could direct the user to the 'beginning-of-path', node 'A' 1102, and could show that user directions of how to proceed from there to the user's chosen "end-goal" 'D' 1116.

The generation of the "end-goals" textual titles that are shown as suggestions 504, 506, 508 in the pop-up window 510 can be rendered using the following method: Use the 'END' screen of the end-goals stated above. Then render a textual name for the description of the suggestion which could be achieved through analyzing said last screen for its HTML properties to yield a text description of the objective through, for example, the extraction of the HTML 'title' tag or biggest 'H' tag (header) of that screen or page.

Figure 5A:
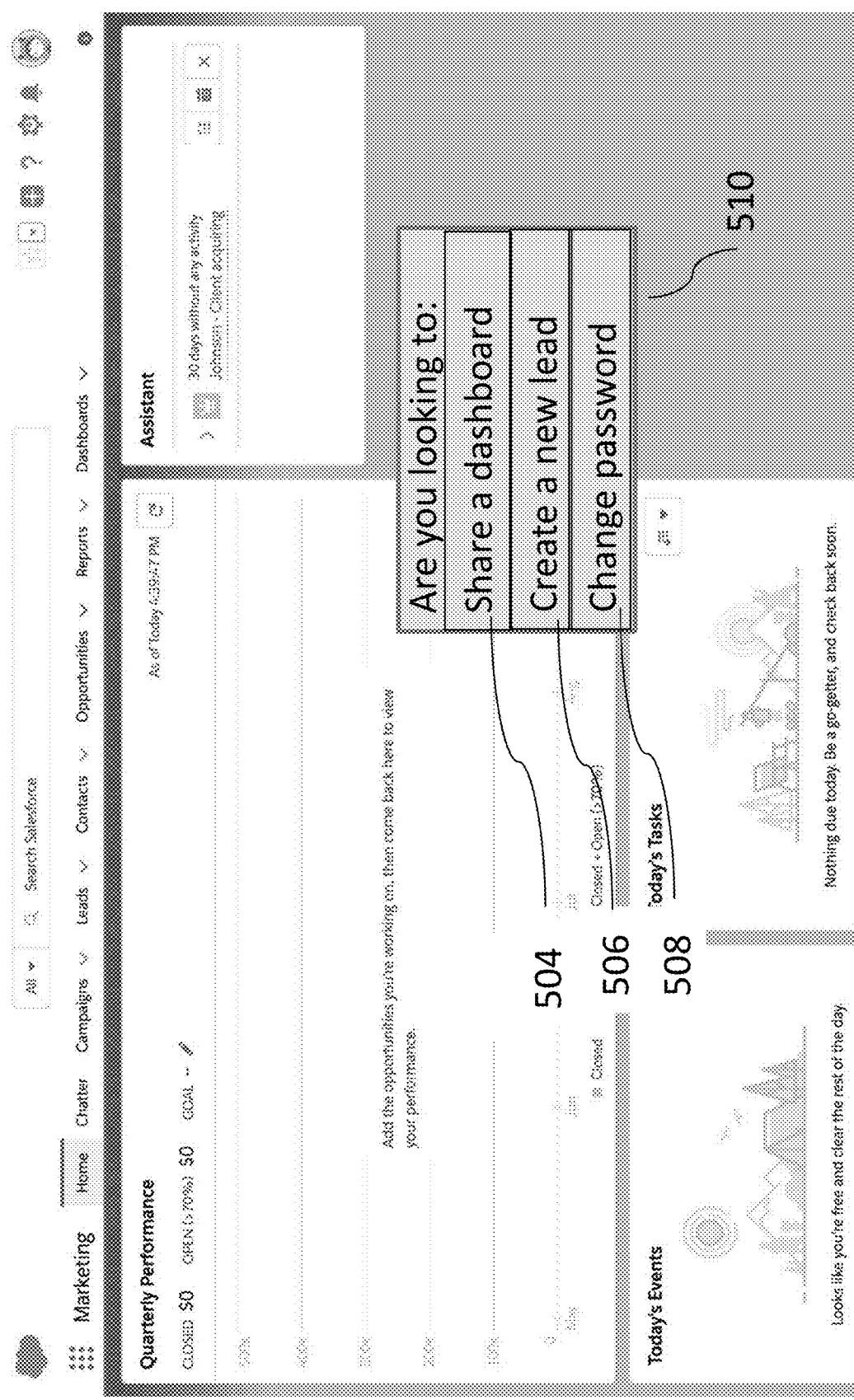
Figure 5B:
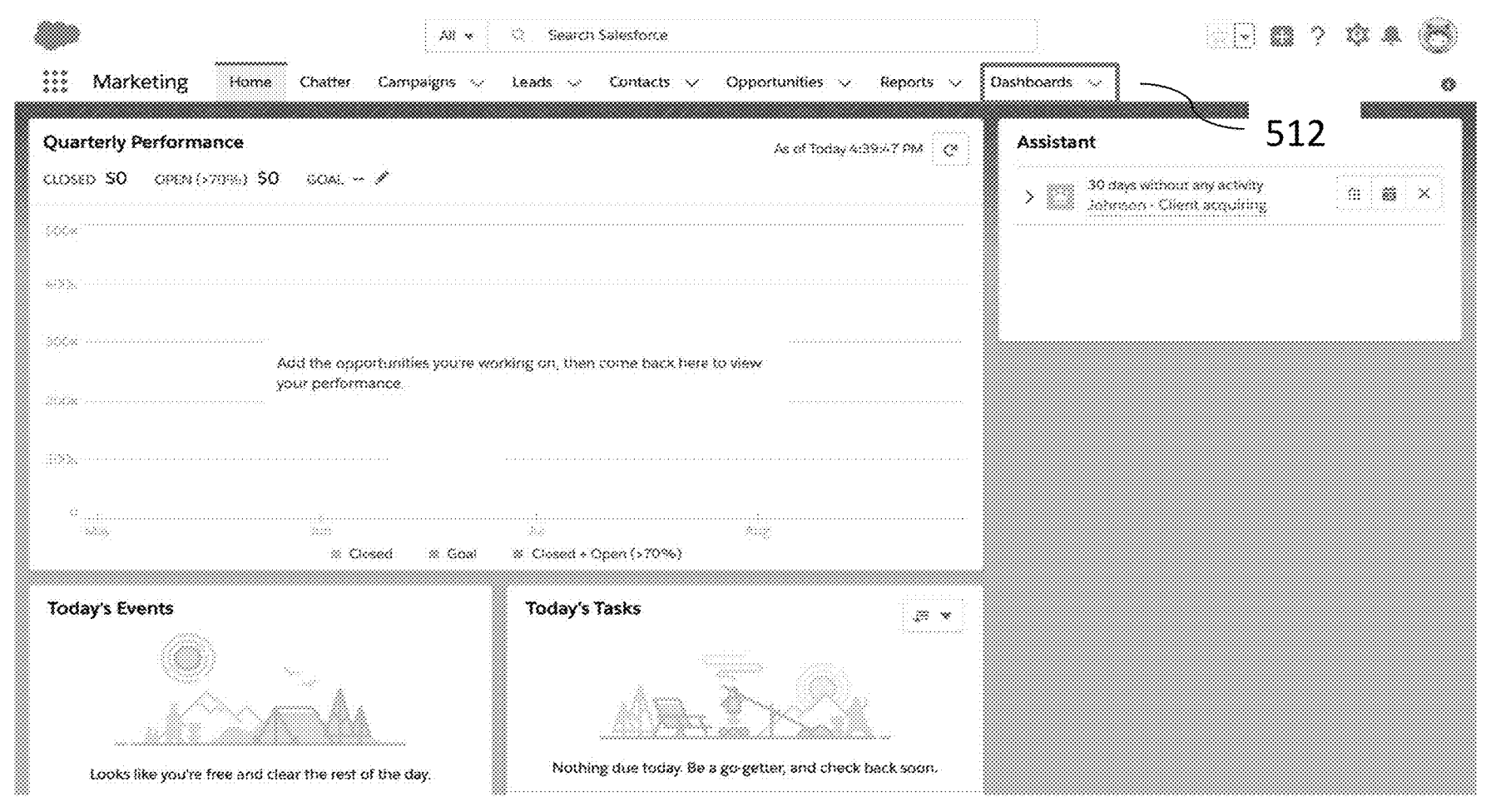

The system guidance could then be according to the user's indication of an "end-goal" which is the objective the user wants to achieve in the SW. Illustrated in FIG. 5A Sales-Force.com as a SW example, with a popup menu 510 with suggestions for "end-goals" 504, 506, 508 for the user. Once the user selects one of these options the system could use the correlating steps taken by prior "experienced" users that have reached the target "end-goal". It could then display the 'suggestions' as indications for possible elements that the user could interact with, at each screen until achieving the "end-goal". For example, if a user chooses 'share a dashboard' 504 from the "end-goal" suggestions pop-up 510 the system could add guidance on the user screen first telling the user to click the 'Dashboards' menu-item 512, as illustrated in FIG. 5B. The system could then indicate to the user, as illustrated in FIG. 6A, Dashboards 606, to click Created by me 608 which could then transition the SW to the screen 'Folders Created by Me' 602, 608, then the system could indicate to click the arrow-button to open menu 610 and to choose 'Share' 604.

Another option of when to show the "end-goals" suggestions is in the case where there are too many suggestions for possible next steps such that it may confuse the user. Thus, when there are more than a few options, for example 3 suggestions for possible next steps, the suggestions may appear in the form of "end-goals" instead of markings for possible elements to click on the screen.

The list of 'end-goals' and "popular paths" could also be predefined manually during the process of the system set up in order to support specific software application needs.

It is also possible that the system could use a "crawler" software method, that is, it could activate a program that "crawls" the structure of linkages between screens of a SW to map the SW structure. This could usually be done with a "crawler" program which is directed to the "home" screen of the "SW" and travels the screens of the "SW" exhaustively between the links to form a map of these screens.

An additional inventive embodiment could be an option for the system to provide help to an experienced user. This could be utilized to assist the experienced user learning of better ways to use the SW. The system could detect paths where some "experienced" users completed a path from the first to the last screens using an observed minimum of steps to achieve an end-goal. This may occur, for example, due to either a "shortcut" operation in one of the screens or by using keyboard shortcuts. For example, an "experienced" user who went directly from screen 'A' 1102 to screen 'C'

1114 by using a "shortcut" link could be learned and preserved to be used again. These suggestions may be shown to "experienced" users at the beginning of paths which enable use of such shortcuts. In this example, a suggestion for a shortcut could be shown on the first screen 'A' 1102, where it could be useful, in the form of a message on the screen about using the shortcut to achieve an improvement in SW usage.

Another inventive embodiment for a suggestions system methodology is to leverage the accumulated knowledge of an 'experienced' user (or user's) use of the SW for semi-automatic interaction with the SW. In such case the system could ask the user to select the objective, that is, the user's 'end-goal'. The choice could be made by mouse clicking as presented in reference to FIG. 5A or even by voice in which the user state his objective and the system use speech to text such as neural network based tool, to select the best fit and confirm the user identity. Once the user selects the desired objective the system can guide the user or even act according to the prior choices of 'experienced' user who end up performing the task resulting with obtaining the declared objective. Utilizing just the learning from 'experienced' user(s) who end up with the declared objective the system could build an experience graph—"EG". The experience graph 302 could be similar to FIG. 3 having nodes 310 and branches 312. For each branch a percent of selection 'PS' 314 is attached. The system could operate using the following suggested flow chart:

A. For the current Node if there is a Branch with PS of more than 90%, then select it and go to B. If not go to D.

B. Do the operation accordingly. Note: if the operation is not just one selection such as making a choice between multiple options, or fills in a text, then wait for the user to do it. Once the user had hit enter go to C.

C. If done indicate "END". Otherwise go to A.

D. Highlight all the Branches having PS of over 25% and provide a light indication of all other Branches. Once the user made a choice of a Branch go to B.

Using the list of 'end-goals' it is possible to create an interactive chat or voice based system which uses Natural Language Processing (NLP) technique(s) to create a conversational "chatbot" that could relate a natural-language user's request to one of the 'end-goals' in the list. Such a process of interactive conversation between the user and the system could be initiated by saying "Computer please help me", for example, to the microphone component of the computer. The user's computer or device could then pronounce in human voice of the possible "end-goals" back to the user, and the user could then state in plain words the desired 'end-goal'. It is also possible to use the keyboard to do the same functions and logic using a text chat function.

In many software products (SW) the users of the software fill-in some forms. It is of value to learn the best ways to fill-in forms from our "experienced" users. Such learning could consist of which fields are most commonly used, the sequence of entering the information by users and in some cases recognizing the type, style, or configuration of the information to be entered.

Figure 8A:
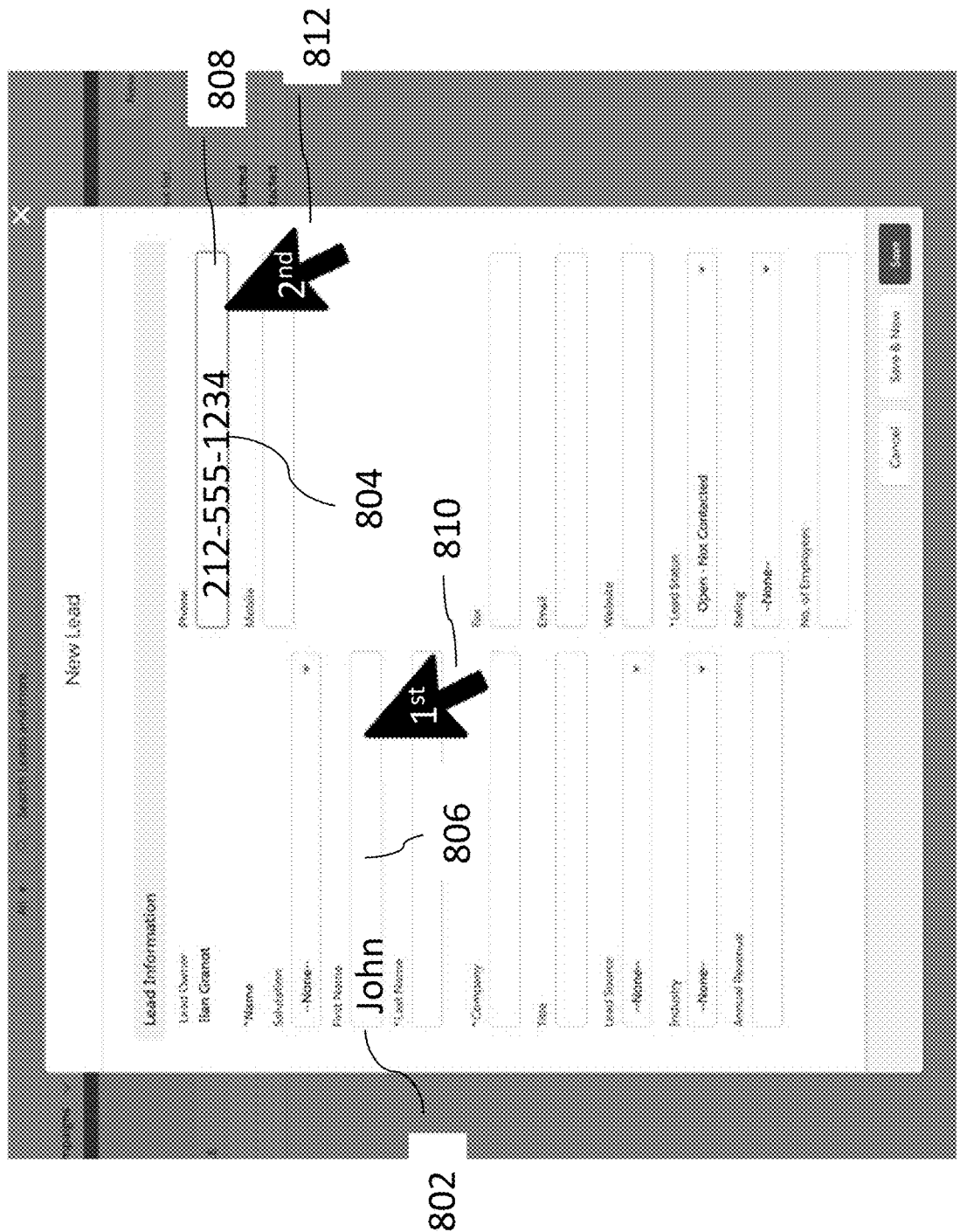
Figure 8B:
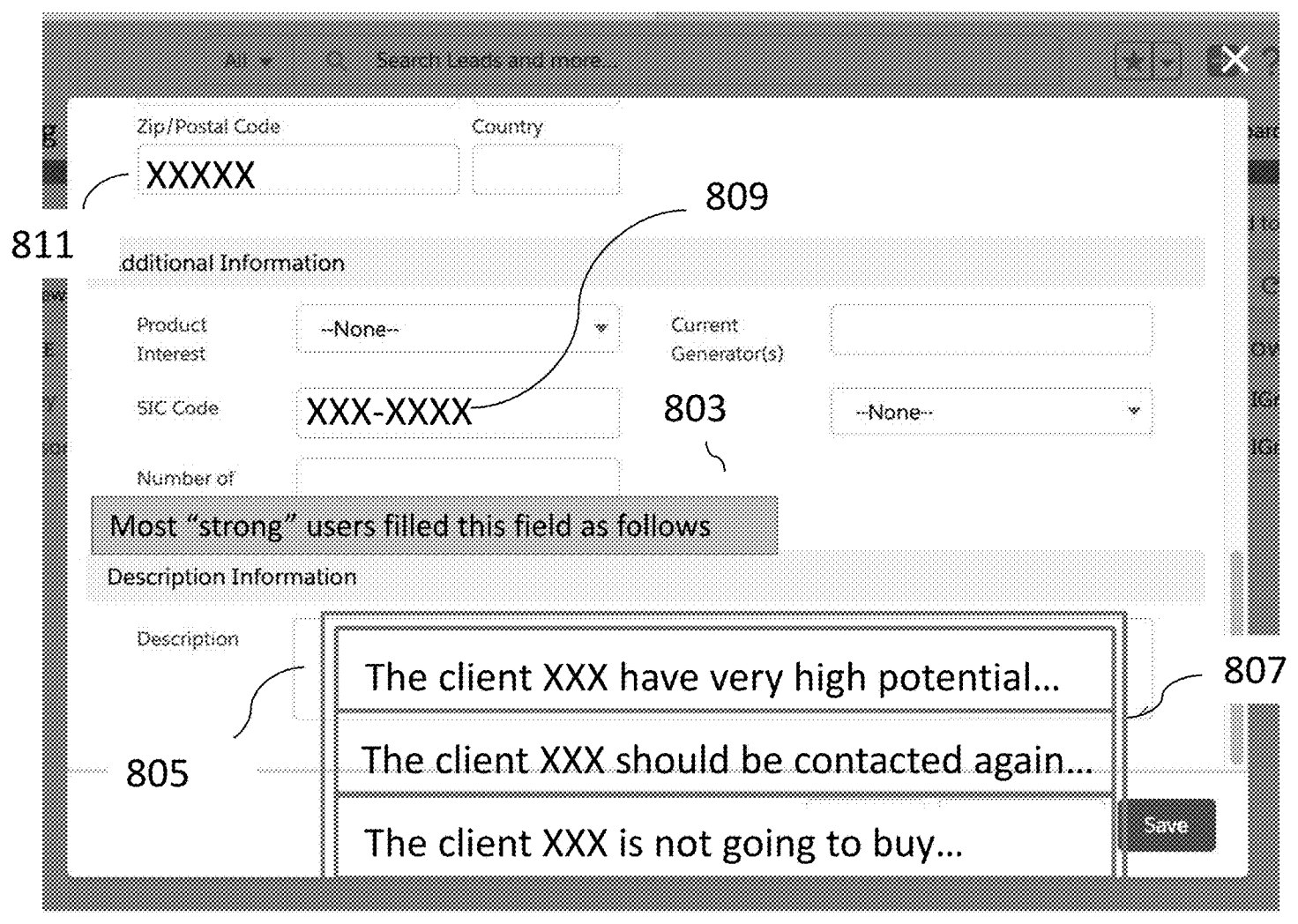
Figure 8C:
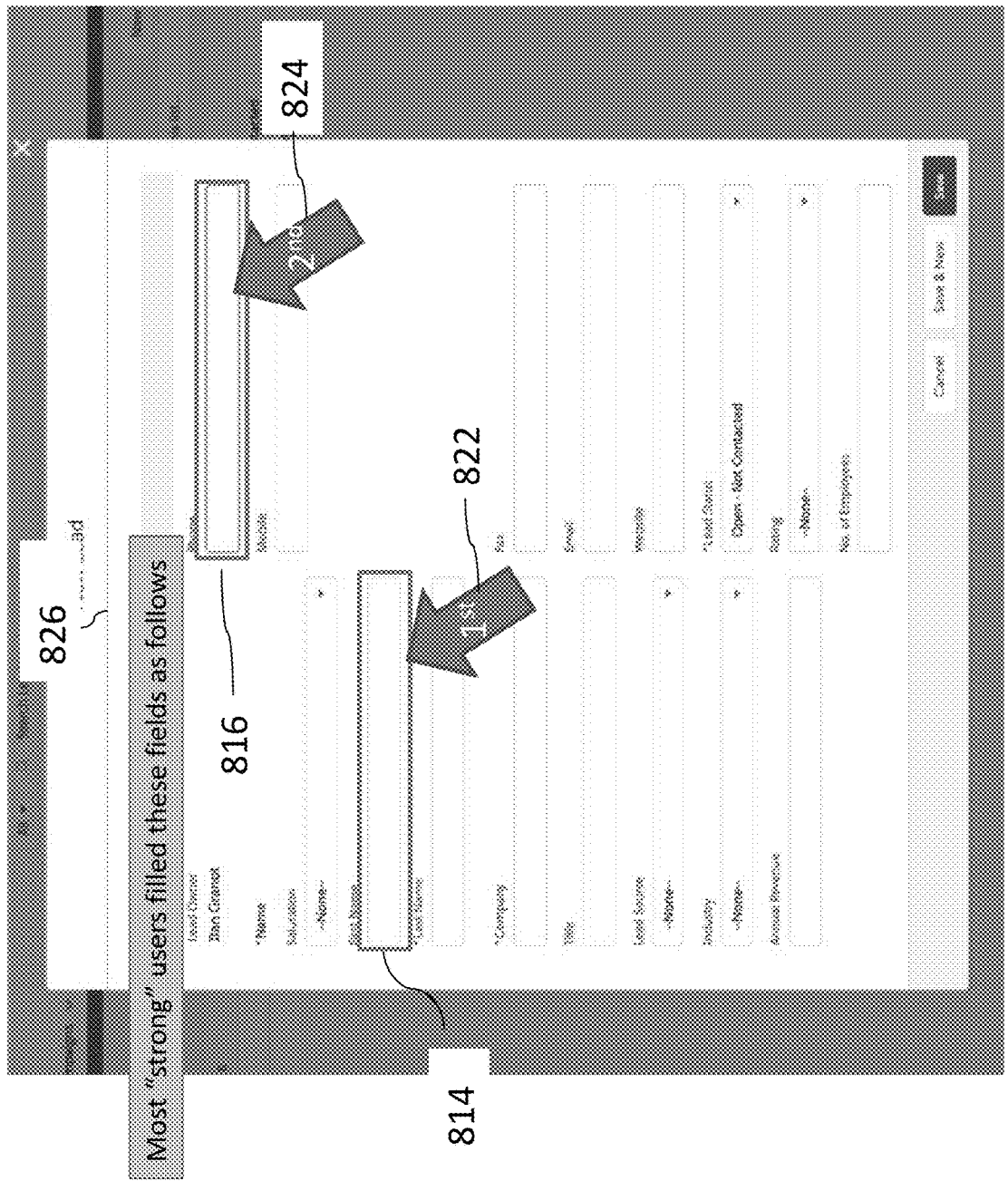

Illustrated in FIG. 8A is a form that contains fields with user entries. The learning could be about which selections the user made and the sequence of the selections made by the user, illustrated here is a partial sequence of the 1st and 2nd operations 810, 812. So the suggestions to the user could be from the most popular fields which were used by "experienced" users, but they could not contain their contents. As illustrated in FIG. 8C the suggestions may be accompanied by a message explaining the suggestions 826 and markings of which fields to fill-in 814, 816, and may include the sequence in which to fill-in the fields 822, 824.

In many cases data entry inputs are specific to each user, that is, a 'specific user-data' is entered into the SW. In the example illustrated in FIG. 8A fields of the form such as, first name 806, phone number 808 and so forth could contain 'specific user-data'. The system could detect these fields as containing 'specific user-data' entries by recognizing that a plurality of users entered highly varied inputs into these fields of the form. For example, in the first name and the telephone fields, different users could enter different text strings for different first names 802, and different numbers for different telephone numbers 804.

In cases where the system detects a form which contains 'specific user-data' it is possible to perform analysis on the inputs made in order to find common text patterns. For example, the minimum length of characters in the input string, a phone number pattern, etc. Such learning about the inputs can later be shown on the screen to other users as suggestions in the form of a template for data entry as illustrated in FIG. 8B. For example, clicking fields 809, 811 could show X's marking the average length or common pattern for entry. Another example is when the "Description" box of the form 805 is clicked, a popup with suggestions 807 is shown with the common text patterns to choose from. These patterns contain one or multiple 'X' characters to indicate where these text patterns contain a high variability of characters. A title 803 with explanation of the popup can also be shown. It is also possible to make the system work without tracking any of the 'specific user-data' inputs. This can be done in order to improve the privacy of the users.

Figure 9A:
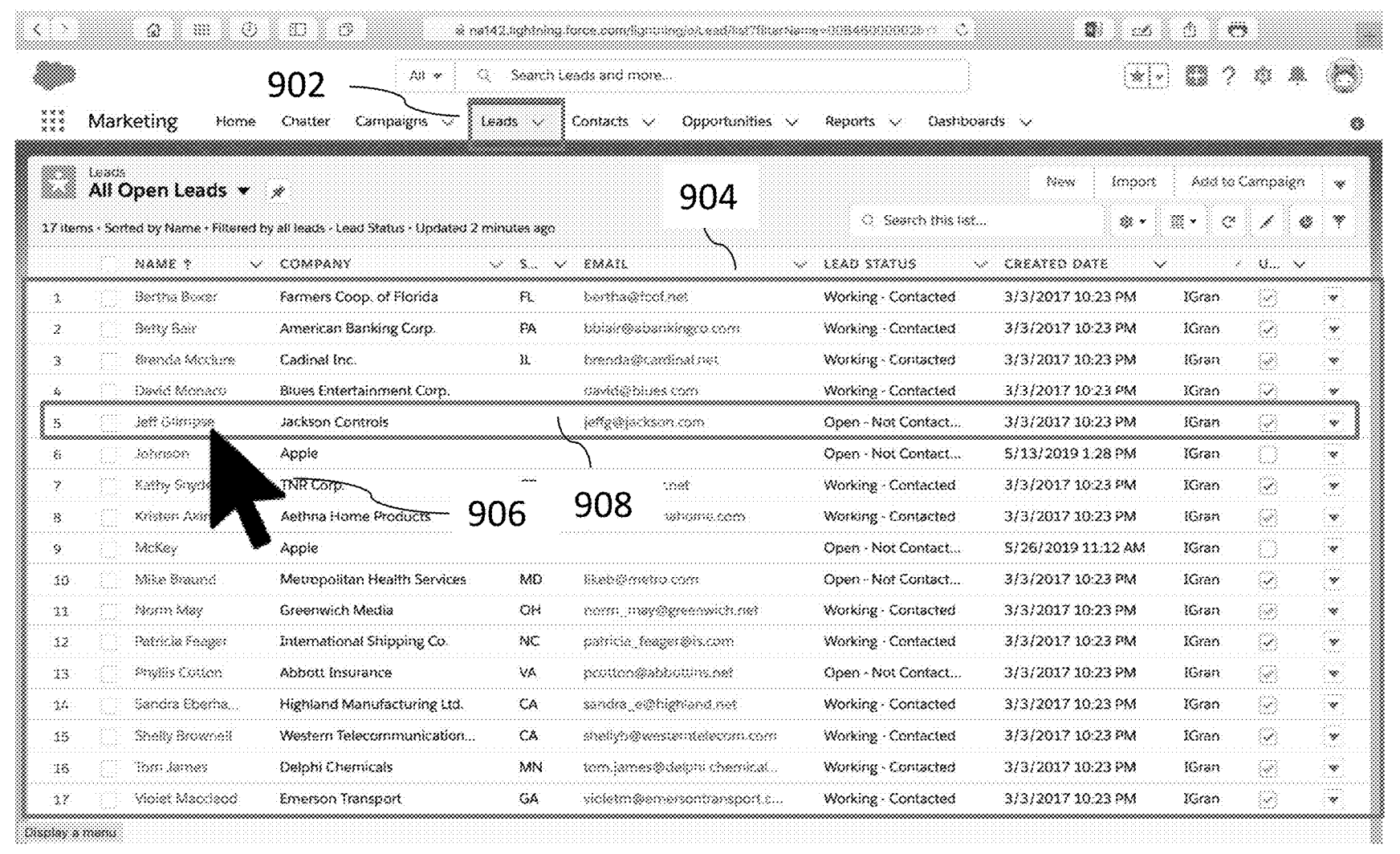
Figure 9B:
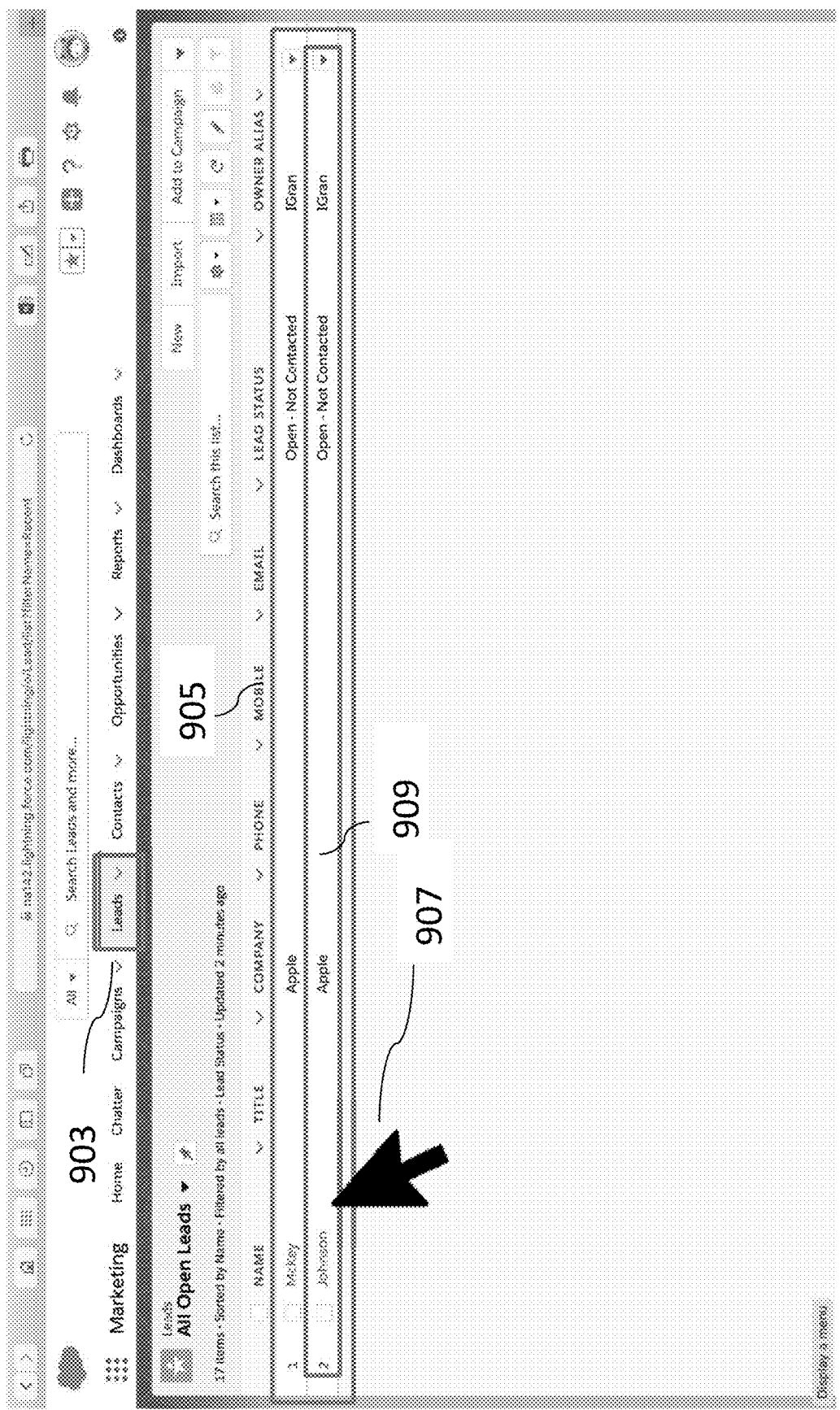

It is common that the SW stores 'specific user-data'. Consequently, different contents could be shown for different users on various screens of the SW. In such cases the system could need to infer a general action from the private cases performed by the 'experienced' users on these screens. Once the system has learned it could be able to show how to do the 'general action' as a 'suggestion' which applies to every user regardless of the user's 'specific user-entries' that are showing on that user's screen. For example, FIG. 9A and FIG. 9B show the same type of screen of the SW for two different users, each screen contains a different list of 'specific user-entries' 908, 909. In this case each user is selecting a "lead" from a personal list of "leads". Thus the selection 906 done by a user for a 'specific user-entry' 908 "lead" is done from the user's own user-specific 'produced list' 904 of "leads". And another user's selection 907 of a 'specific user-entry' 909 could be from that user's own 'produced list' of "leads" 905.

The system could perform the learning as follows: In the case of users clicking on 'specific user-entries' the learning could be from the 'specific user-entries' selections made by the plurality of 'experienced' users. The selections performed for a SW screen could be grouped by a common attribute that is related to the common area that contained the plurality of these 'specific user-entries' selections. Such an attribute could be the ID of the displayed 'content section' ("CS"), like an HTML tag where a section ID='leads'. Such 'specific user-entries' selections could be recognized by their content section and grouped to form a general action. So in the illustrated example there could be multiple 'specific user-entries' selections such as 906, 907 (usually from more than two different users), and all of them could be in the same 'content section' which is the 'produced list' of "leads" displayed on the SW screen.

As an alternative, the 'general actions', and 'specific user-entries' could also be predefined manually during the process of the system set-up in order to support specific software application needs.

Figure 9C:
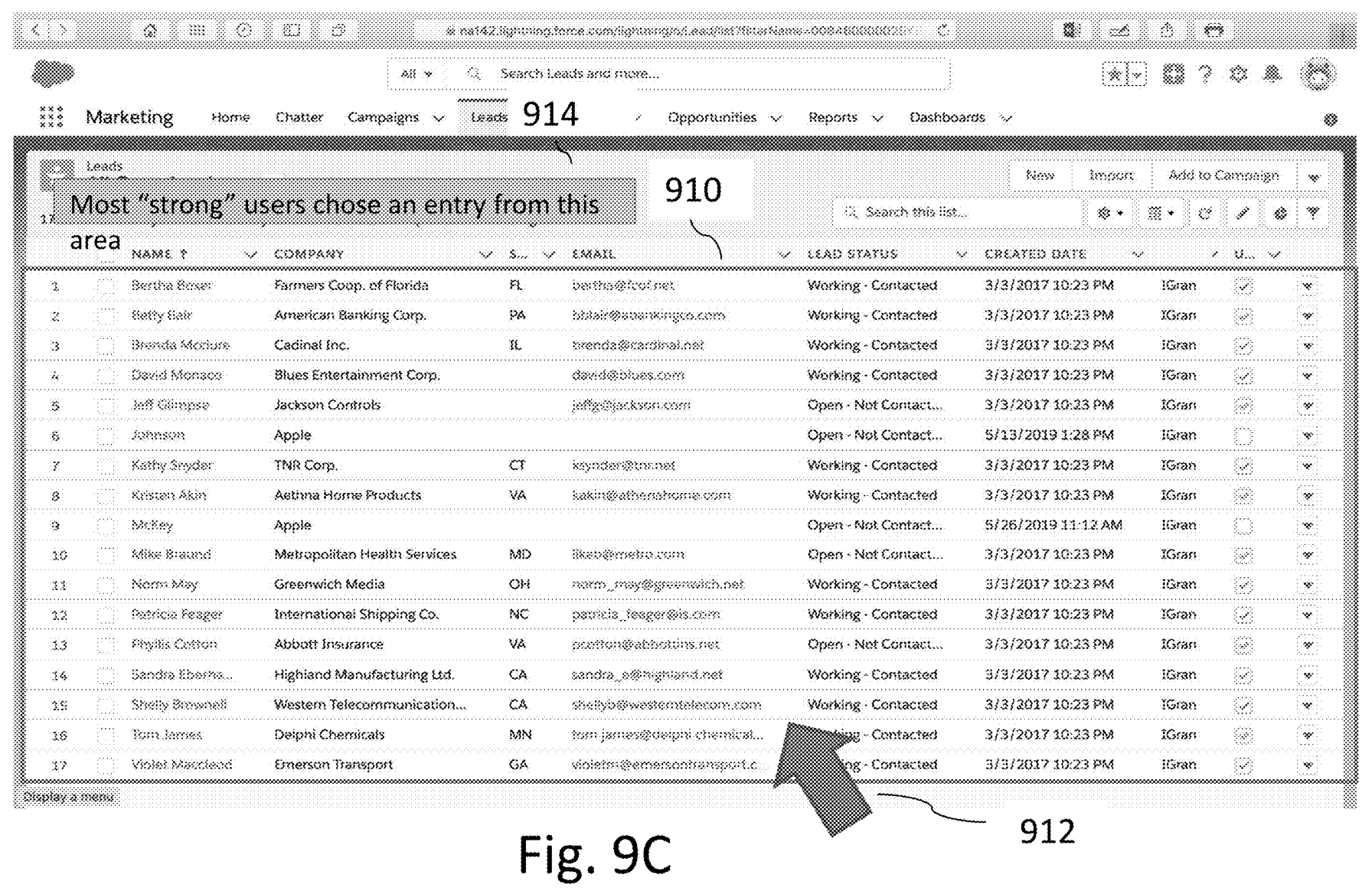

The displayed 'suggestion' for the 'general action' learned is illustrated in FIG. 9C. Specifically, it could contain an explanation message 914, and a rectangle around the entire selection area 910 which implies to the user can select any entry liked within that rectangle. Also illustrated is an arrow 912 pointing to the general action area of selection.

Figure 10A:
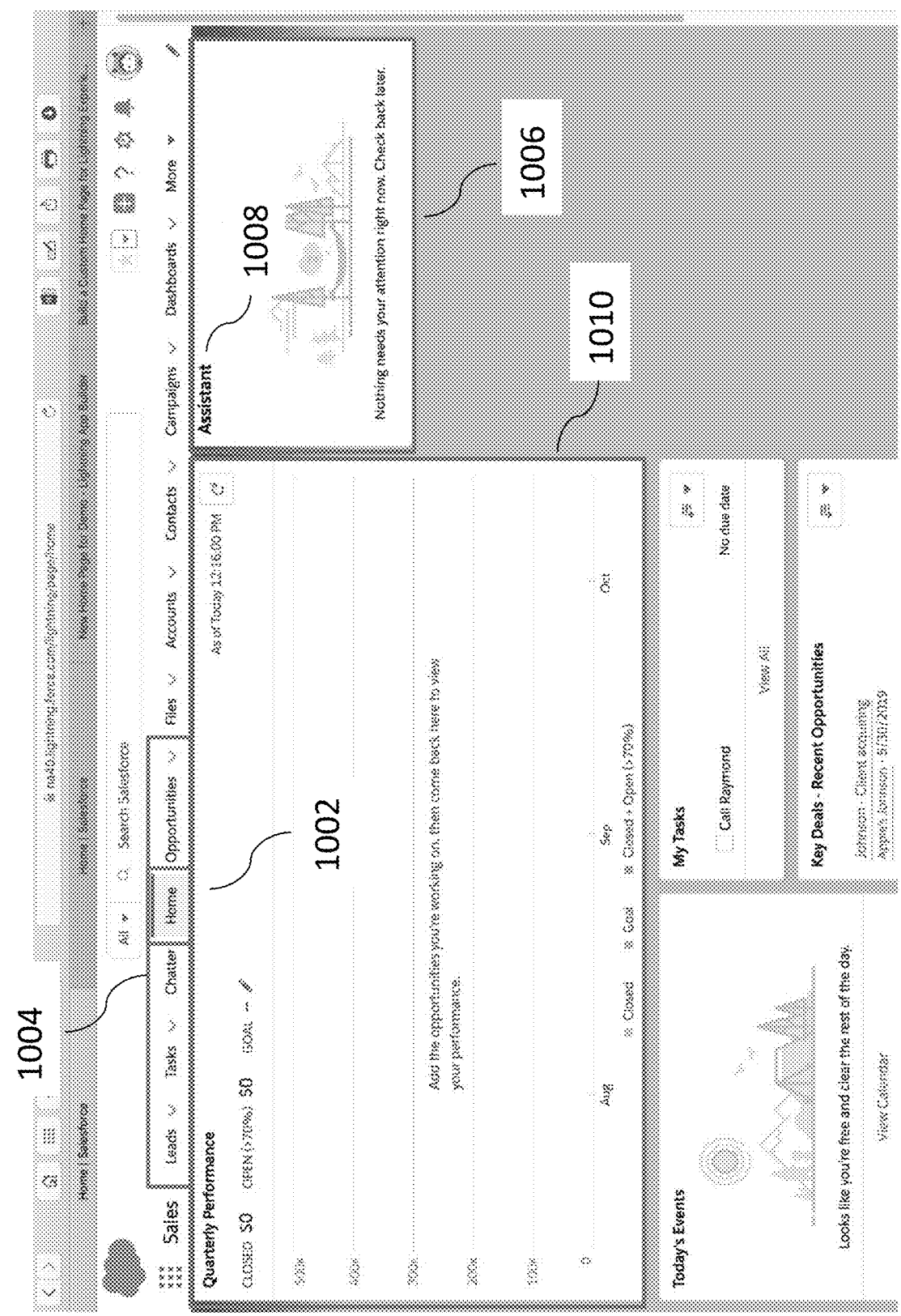
FIGS. 10A-10B are examples of learning from different windows positioning in user customized screens.
Figure 10B:
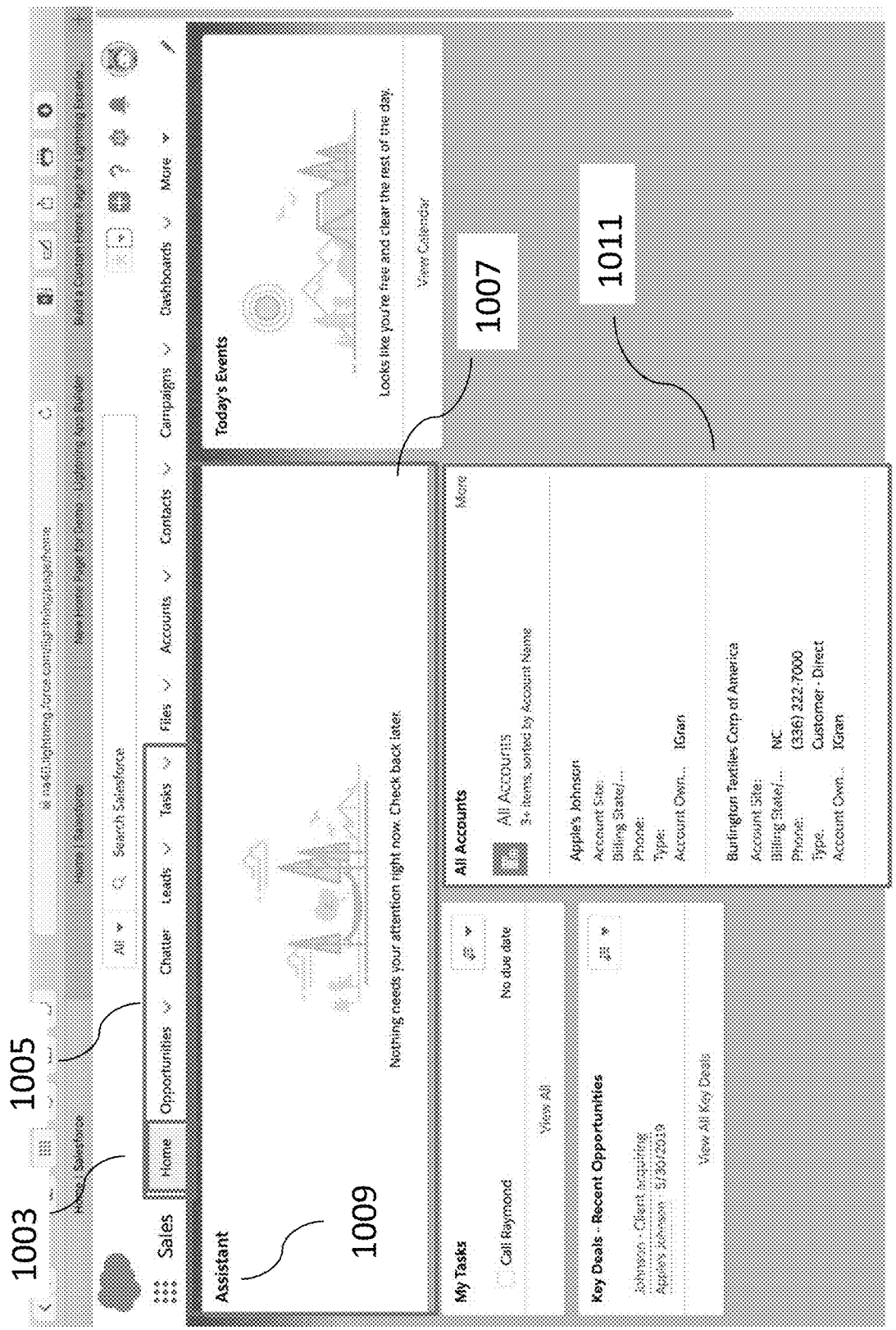

In some cases in the SW the user could have an option to rearrange the interface screen to the user's liking. Shown in FIG. 10A and FIG. 10B are the customized home screens of two users. In such scenarios users can move windows in the screen to different location and even to reshape them. For example, in these illustrations the home screen of each of two users shows a window with the same purpose, and a title "Assistant" 1008, 1009 located at two different locations 1006, 1007. In order for the system to form a learning even when these screens are customized it could include a module to map the input of a specific user set up to a standard set up map. By mapping all users to a standard setting learning and aggregating user experience could be applied. Additionally, by using this method the removal of some of the windows from the view of a certain user could not negatively affect other users, as shown in the illustration, for windows 1010, 1011 each show for one user but not to the other.

Specifically, the learning when screens are customized could work as follows: first the system could recognize a 'user choice' made in a customized area on a SW screen. This is done through scanning the structure of the current user screen setup for its elements, and recognizing the common sections on the screen where users have made actions within them. For example, a table with the information about a user's key metrics, to do list, etc. can show for one user on the left side of the screen and that list could show the user's related information, whereas for a different user of the same SW the list could show somewhere else on the screen and could show a different information related to that user. Nevertheless, both content areas of the SW could contain webpage information, for example in online SW, which could point to the same type of context or source. Albeit their different locations the HTML id of each differently located area could be the same. Also, for most webpages same purpose windows could have the same title as illustrated in 1008, 1009 and could usually contain the same HTML id.

Alternatively the Transmit interaction 106 could also transmit the user interaction in setting up the choice of the displayed page layout for easier mapping from a user specific page layout to a standard layout to aggregate various user use of the SW—learning. The Present assist 105 could include a utility to map back the assist indication to the user specific page layout.

Furthermore, the system could learn even when other elements on the screen are customized, such as, menu items. Illustrated in FIG. 10A and FIG. 10B is a menu where the order of the 'menu buttons' elements 1004, 1005, is different. Any selection that is made by a user is tracked by the element's HTML id which is not related to the location of the element in the menu, or on the screen. This is also the case for the button that is related to the current selected screen "Home" 1002, 1003 which in each figure is located differently, but is still learned the same. It is also the case for any other clicked element in menu items 1004, 1005.

These 'content sections' could also be predefined manually during the process of the system set up as user specific in order to support specific software application (SW) needs.

Another approach to help novice users by leveraging the knowledge of experienced users is to create a context aware repository for sharing knowledge about Information Technology (IT) subjects. Such a system could serve for sharing "Knowledge related to IT" (ITK) determined by the state of the user, computer and software that is currently being used by the user. The information being shared could be of any type that could be stored on a computer, such as, file, video, audio, text, computer code, script, link, etc.

Figure 14:
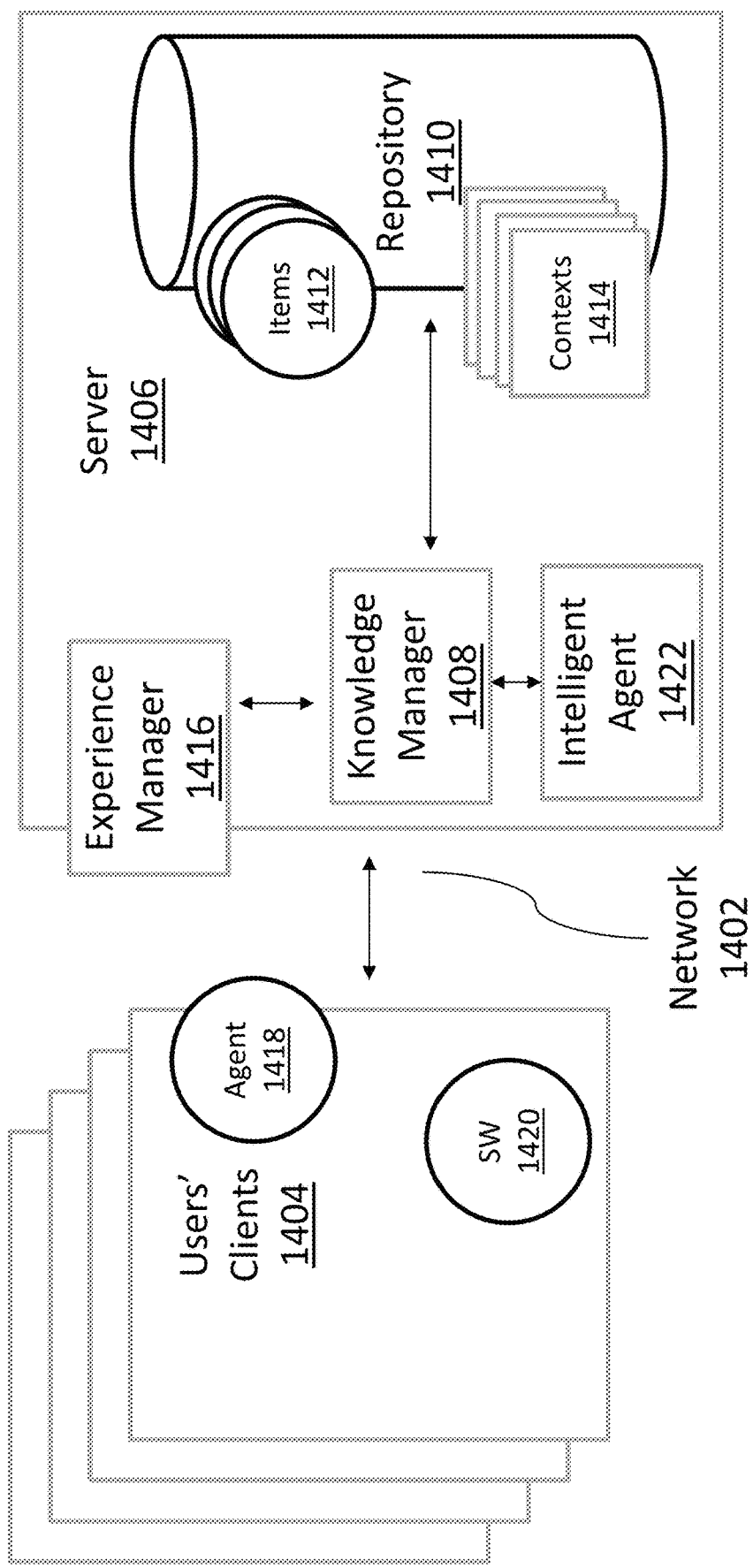
FIG. 14 is an example illustration of the context aware repository for IT purposes.

The system could be comprised of, as illustrated in FIG. 14, a Server 1406 that interacts with clients' devices 1404, running software 1420 and agent 1418, over network 1402 to transmit and receive information about the contexts 1414 of the clients 1404 and about "ITK" in the form of items 1412. The server could include an Experience Manager (EM) 1416 to manage the requests and responses of the server and the proficiency level (i.e. experienced and inexperienced) for example using the system previously described in FIGS. 1-11, and a Knowledge Manager (KM) 1408 that could store and retrieve the items 1412 in the repository 1410 along with an indexing system of their contexts 1414. The KM could further employ an Intelligent Agent (IA) 1422 which could use Artificial Intelligence, statistical methods, or other computer algorithms to derive conclusions for the purposes of indexing and other KM related purposes. The system could have the client side loaded portion 1501 be adapted to web-served systems (SaaS) via an Application Programming Interface (API) usually in the form of an add-on software code to the web software, as a runtime application component on the client's device, or as a Software Development Kit (SDK) to be embedded according to a programming language.

Figure 13:
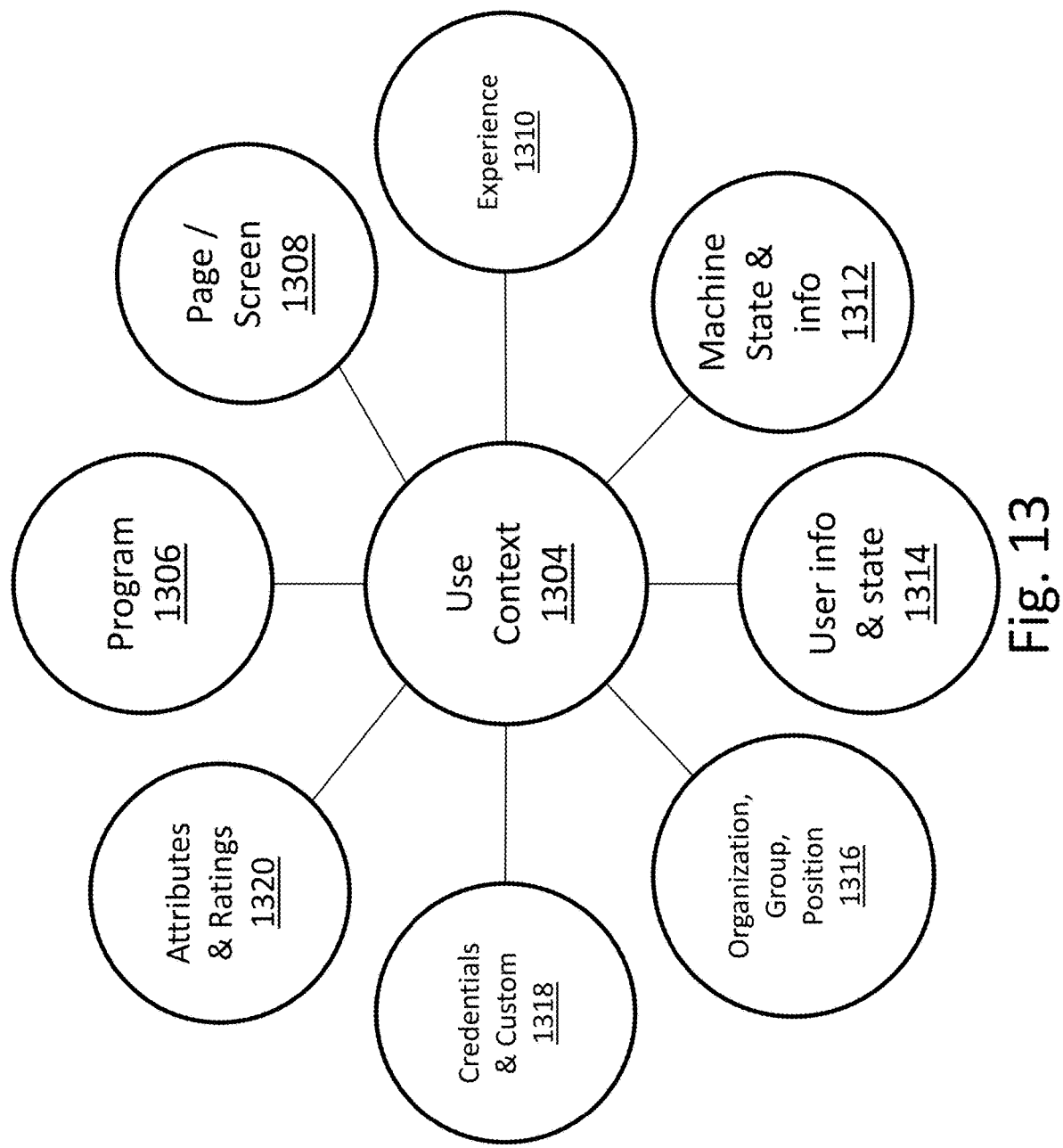
FIG. 13 is a diagram of possible information to be used to define context.

The Knowledge Manager could employ an indexing system such that the relevant Context 1414 of an item 1412 could be determined according to Use Context (UC) 1304, as in FIG. 13, and attached to each item of information stored, or used upon retrieval.

Context 1304 could be determined according to:

a. Program 1306—The current SW being used by the user on the client device.

b. Page/Screen 1308—The current page or screen of the SW. Could be a URL, a page of cloud software or a window or screen of a program in running on the device.

c. Experience 1310—The experience level of the user.

d. Machine State & info 1312—The type of device, like type, brand, memory, peripherals, specifications, etc. and state, like available memory, current CPU consumption, etc.

e. User info & state 1314—The id of a user, email, address or location, age, title, etc., and state such as active, banned, etc.

f. Organization, Group, Position 1316—The organization the user is considered part of, could be a company or enterprise (e.g. StateFarm), website (e.g. Wikipedia.org), or other entity. Group—for example, sales, service, manufacturing, IT, or a division of company. Position—for example, representative, manager, lead, engineer, CEO, shareholder, administrator, etc.

g. Credentials & custom 1318—Credentials could be settings related to security and information restrictions control, such as, read, write and delete, read and write, read only, write only, delete only, no access. Credentials could also include trusted, or untrusted, or known, or unknown which could be determined by the grouping of a user. For example, an employee, client, or registered user of a website is known and an unidentified user is unknown. Custom—new context rules which could be user defined, or determined by the IA 1422.

h. Attributes & Ratings 1320—Attributes could be any set of attributes that is of interest and can be tracked, for example, how many times the user is logging in per week, how many hours of use per day, whether he uses certain SW or not, whether he uses the described system (GoUsers) and how. Ratings—could be any type of user feedback the user gains from other users, for examples, did other users "vote up or down" or "liked or disliked" the user or related items 1412.

For example, the KM 1408 could for the purpose of storing and item 1412 determine a context 1414 for an item according to the following scheme:

i. a Program 1306: "Salesforce.com",
j. where the Page 1308: "Dashboards"
k. where experience 1310: experienced
l. where the user is using Machine & state 1312: "Apple MacBook Pro 13" "with "Chrome browser", no problems found.
m. with User Info 1314: johndoe@gmail.com, user id: john123, CA/USA, Mr., active
n. with "Company, Group, Position" 1316 is: works for StateFarm, manager, sales
o. Credentials 1318: can read and write (add new and edit) and delete user's own files, can read and write (add new and edit) all of user's department files, except marked personal, can read and write (add new) from manager's department. Custom: User created group "Promoted managers" and has administrator rights over it.
p. Attributes & Ratings 1320: Attributes: User is using the system daily Monday-Friday, on average 5 hours a day. User is using on average 2 hours of Microsoft Word program, Google Chrome and Microsoft Outlook. Ratings of the user: User got 314 likes for video item shared (for example item no. 12345) which was viewed 1245 times, and 52 likes on text item shared (for example item no. 56789), which was used 213 times. User liked items 23456, 34567, and 45678. And used items abc123, cbd234, def456.

Figure 16:
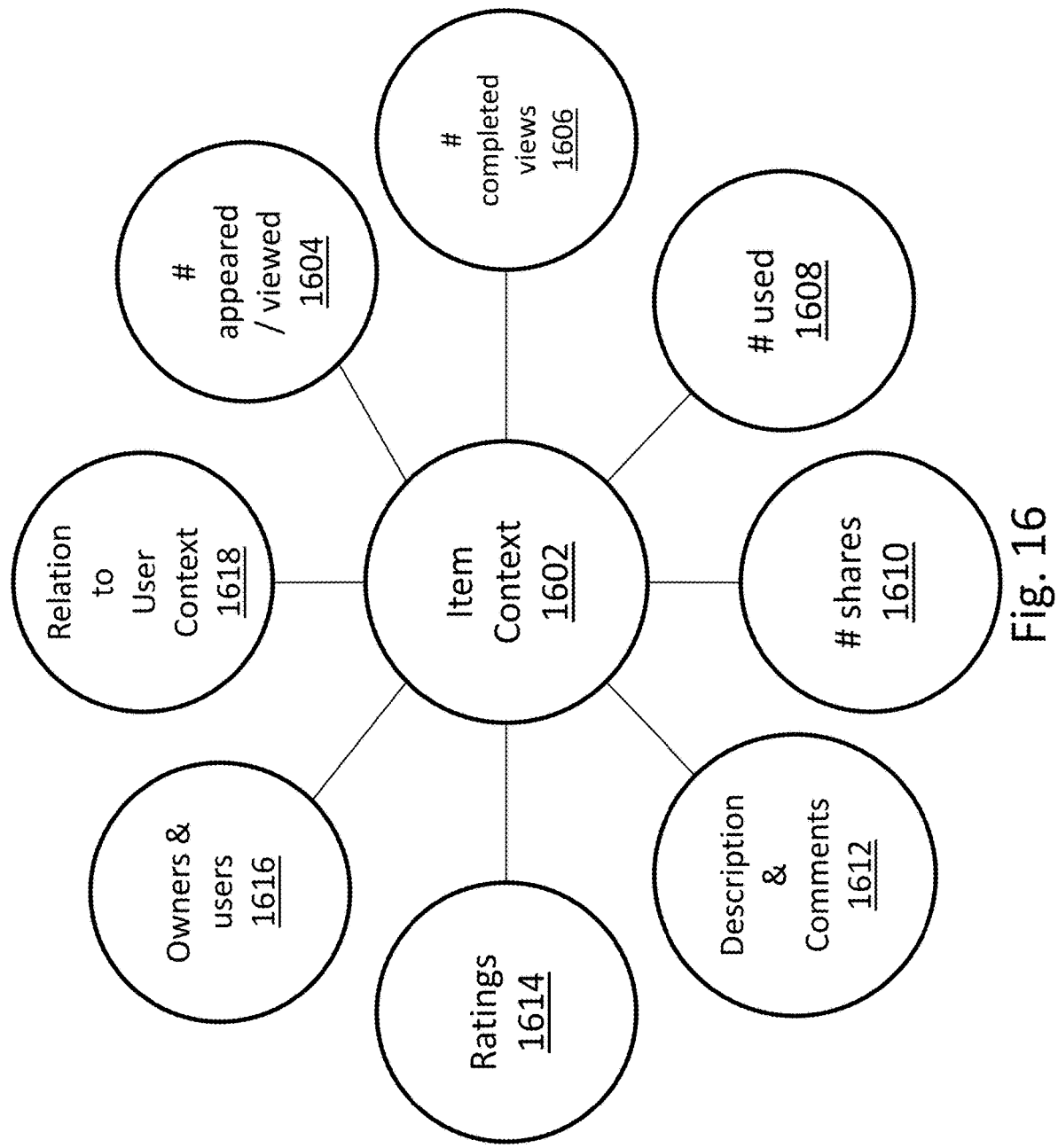
FIG. 16 is an example illustration of an "Item Context" schematic.

Furthermore, the KM could add to the context 1414 related to an item 1412 an Item Context (IC) 1602 as shown in FIG. 16. Such IC could be determined by:

q. Number of times the item has been viewed (video, etc.) or accessed (text, etc.), and the number of times the item has appeared (before accessing) as a suggestion on users' devices, 1604
r. Number of times the item has been viewed to completion (text scrolled to end, video watched to end), 1606.
s. Number of times the item has been used, for example, macro recording been applied, text copied, or copied and pasted, suggestion been followed, 1608.
t. Number of times the item has been shared with others, 1610
u. Number of comments the item has received, an optional analysis of their contents for example an analysis for sentiment, and an optional text analysis of the description, 1612.
v. The ratings score an item has received from other users for example from "likes or dislikes" or up-votes and down-votes", could also, for example, have different weights for ratings from "strong to novice" users, 1614.
w. The owner/s of an item, for example, the creator, the IA 1422, few creators and users together. And, an optional list of all users who accessed that item, 1616.
x. Relation to Use Context 1618 is relating the context of the Item Context 1602 to the Use Context 1304 as the creator of the item and the context the item has been created in.

Figure 17:
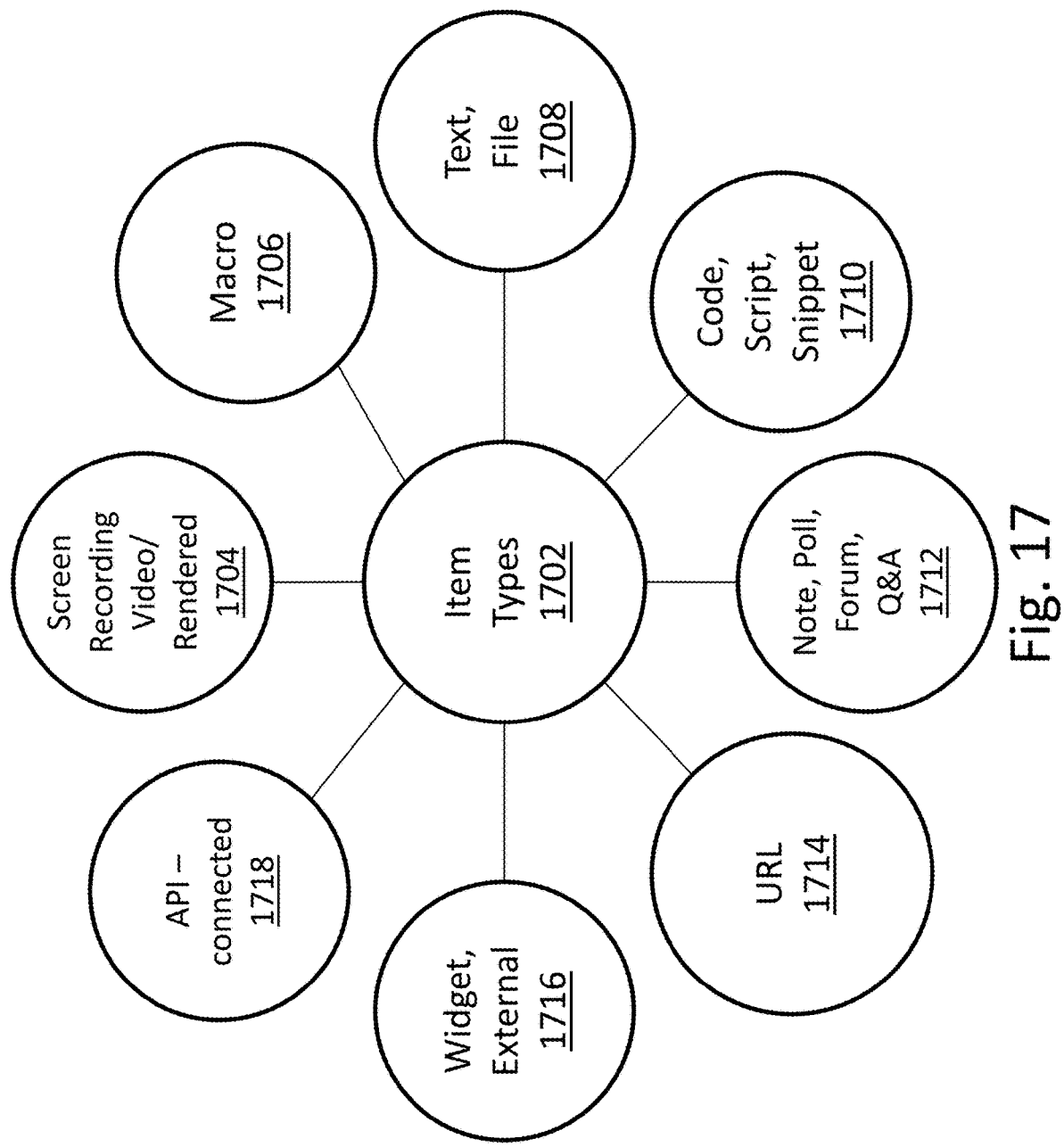
FIG. 17 is an example illustration of an "Item Types" schematic.

An item 1412 could be of the following computer data, as illustrated in FIG. 17:

y. Screen recording 1704—A video file result of the device's screen that was recorded using an embedded screen-recorder as a feature of the system, or was recorded using a connected camera, or was uploaded, or was provided a reference to a network address. Or, a rendered video that was created using a system that tracks the user and produces a rendered video of the use of the device as a result of the user's actions, for example, using heatmaps to locate user's interactions and simulating a mouse curser that clicked on a transposed screenshot of the user's current screen. Taking a screenshot instead of a video is also possible.

z. Macro 1706—A recording of one or more steps of interactions with the elements on the screen and their sequence to be stored and used later to replicate such a recording for automating the interaction.

aa. Text or file 1708—A text entry could be of any size from 1 character to a "large" text file, or any other computer file to store.

bb. Code, Script, Snippet 1710—A computer code of any programming language or type, which could be of any size from 1 character to a "large" source code file. The source code or text could show up in a source code or LaTeX editor with advanced features for editing or with explanations.

cc. Note, Poll, Forum, Q&A 1712—Textual note to other users, or to mark context using a predefined category such as mark with a hazard icon, a Poll with several options to vote for, for example voting on suggested options a-d, Forum with subjects and threads, a questions and answers system.

dd. URL 1714—A link to a network (web) address.

ee. Widget or External 1716—A small area to be displayed that displays some content in an preorganized fashion, provided by either the system or a compatible $3^{rd}$ party.

ff. API-connected 1718—an Application Programming Interface connection to a $3^{rd}$ party to provide a data type or data interfacing for an item.

The information in the repository 1410 could be provided by the "experienced" users, and also in combination with an intelligent agent of the Knowledge Manager (KM) 1408 employing advanced techniques such as algorithms, statistics and AI. Thus, if a user is recognized as an experienced user, the option to contribute to the knowledge could be available in the form of options such as record a new video, record a new macro, or answer existing questions that are related to the user's current context. The option could come in the form of a message on the screen that asks the user to help others with "ITK" subjects related to this screen. The ITK item 1412 created as a result is stored in the repository 1410 and attached (relate) to the current context 1414. After storage the decision whether to share with others or not and with who could be determined by the creator of the item and other users who have the rights to do so.

If a user is recognized as a novice user (i.e. an inexperienced user) the system could offer that user items 1412 in the repository 1410 that are related to the user's current context and according to an order determined by the KM 1408.

In one embodiment of the current invention the KM 1408 could render a list of relevant items (1412) and order it by the correlation between the contexts (1304, 1602, 1702) of the current user's status of using the SW determined by the agent 1418 and the contexts of the items 1414 in the repository 1410.

Figure 12A:
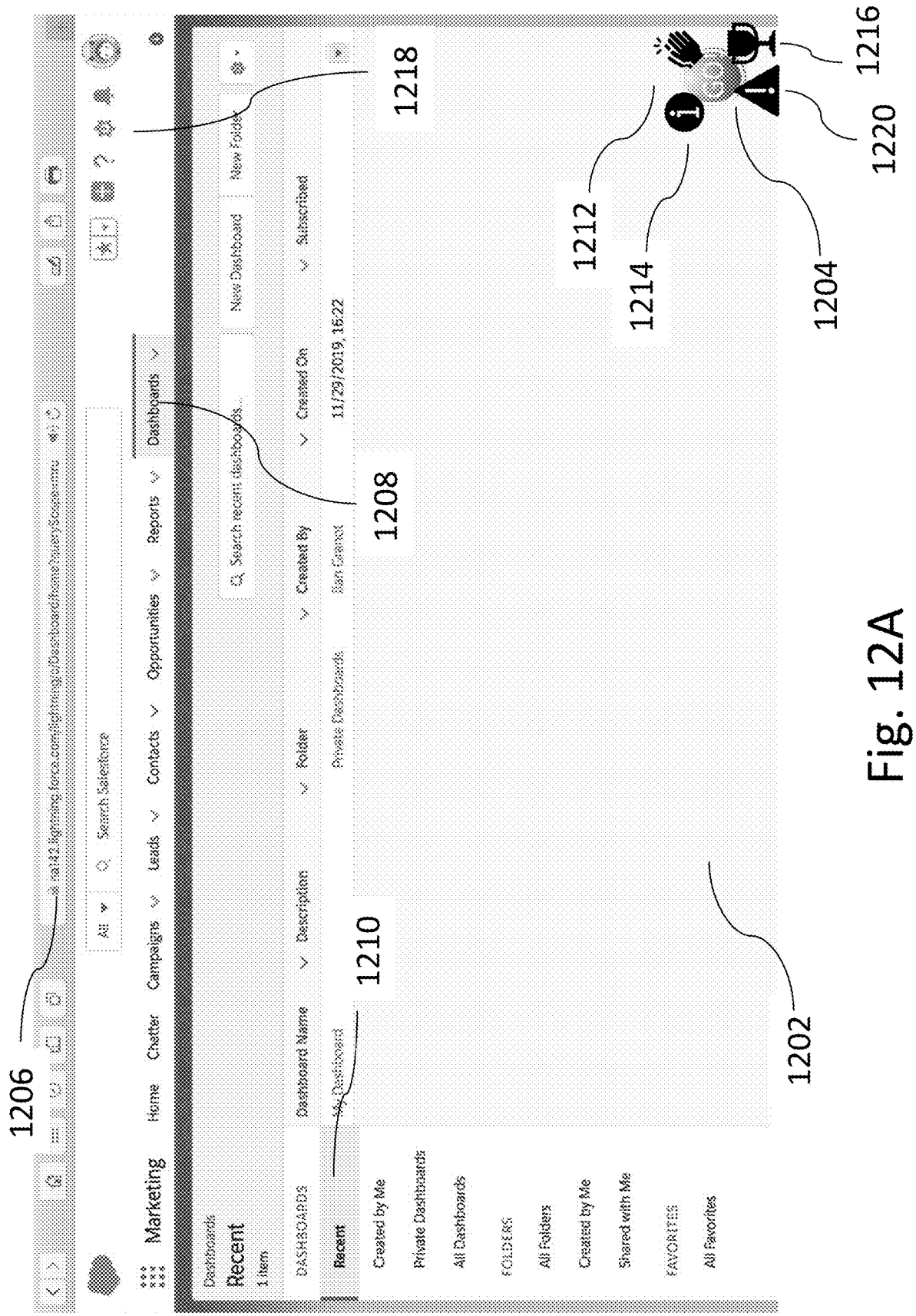
FIGS. 12A-12B are examples of SW with a button to mark to the user of a possible help and a resulting window with content offered according to context.
Figure 12B:
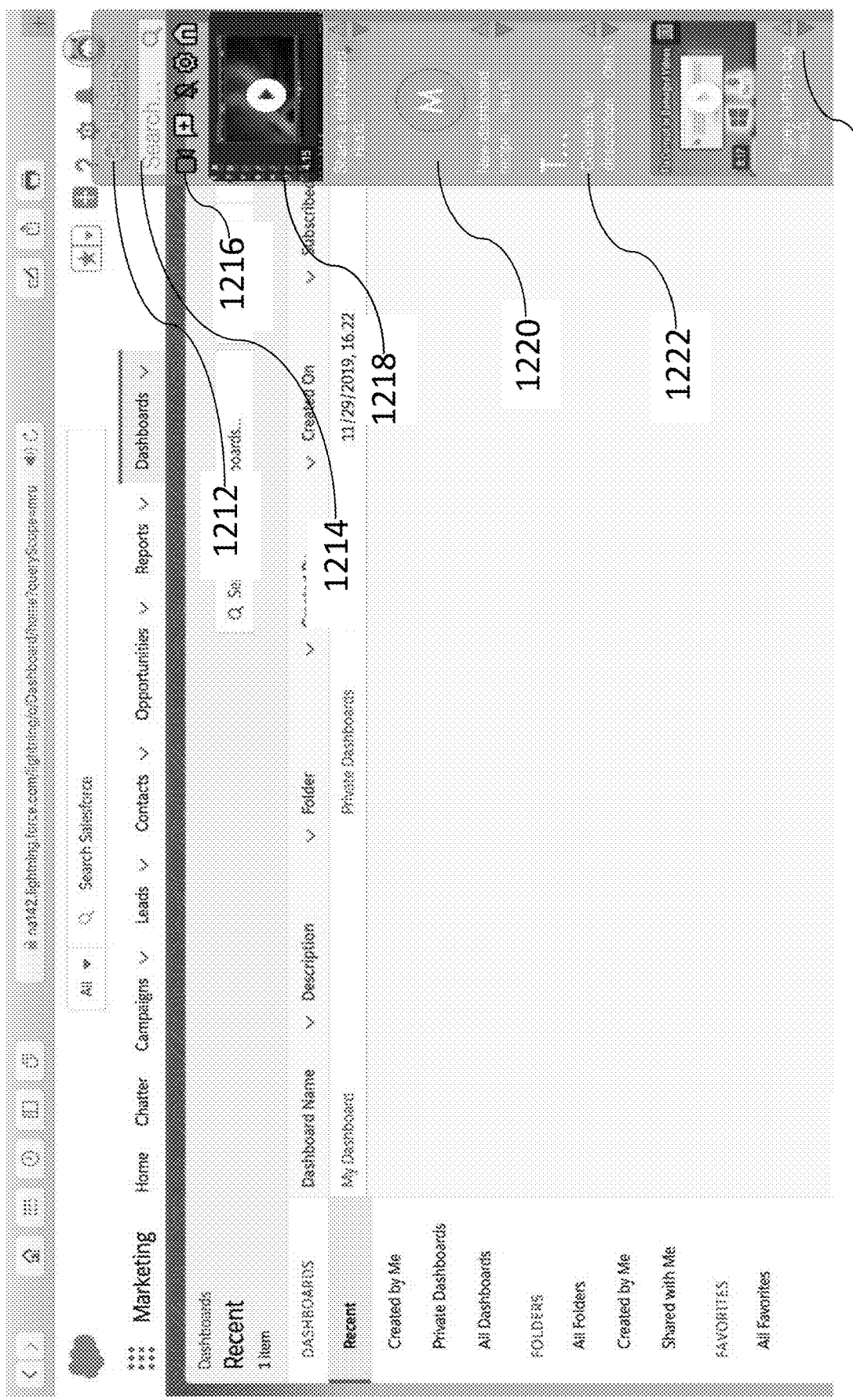

The following is an example of a way the system could work. The information stored in the repository 1410 could be shared with a novice user or an option to contribute to others is offered to an experienced user. As illustrated in FIG. 12A a SW screen 1202 in which a user was recognized either as an experienced or inexperienced user and an icon "GO" 1204 could be shown. Next to the icon could be an indication of offered "help" 1214, a good user indication and "request for help" clapping hands 1212, and a "helpful" user which helped before with an award icon 1216. The context of the page for the sharing purposes could be determined by several indicators that some of them are the current state of the user in the SW. In this example the URL of the software 1206, the current screen 1208, the current function 1210, and optionally an API to communicate with the SW. When a user clicks on the "GO" 1204 icon a window of the system 1212 could pop and show items from the repository according to the context. Such items could be: related video or screen recording 1218, related macro recording for automation or screen context recording 1220, related text snippet, poll, or forum 1222. In case a user is recognized as experienced a marker to record video or macro could be shown, if a user is inexperienced the user could ask for help by clicking an icon for question in the icons area 1216. The shared items could also include data tags to display the item's creator and a rating and voting mechanism 1224 next to each item. The order of display of the items could be related to their ratings or other attributes determined manually or by an intelligent agent of the KM.

Figure 15:
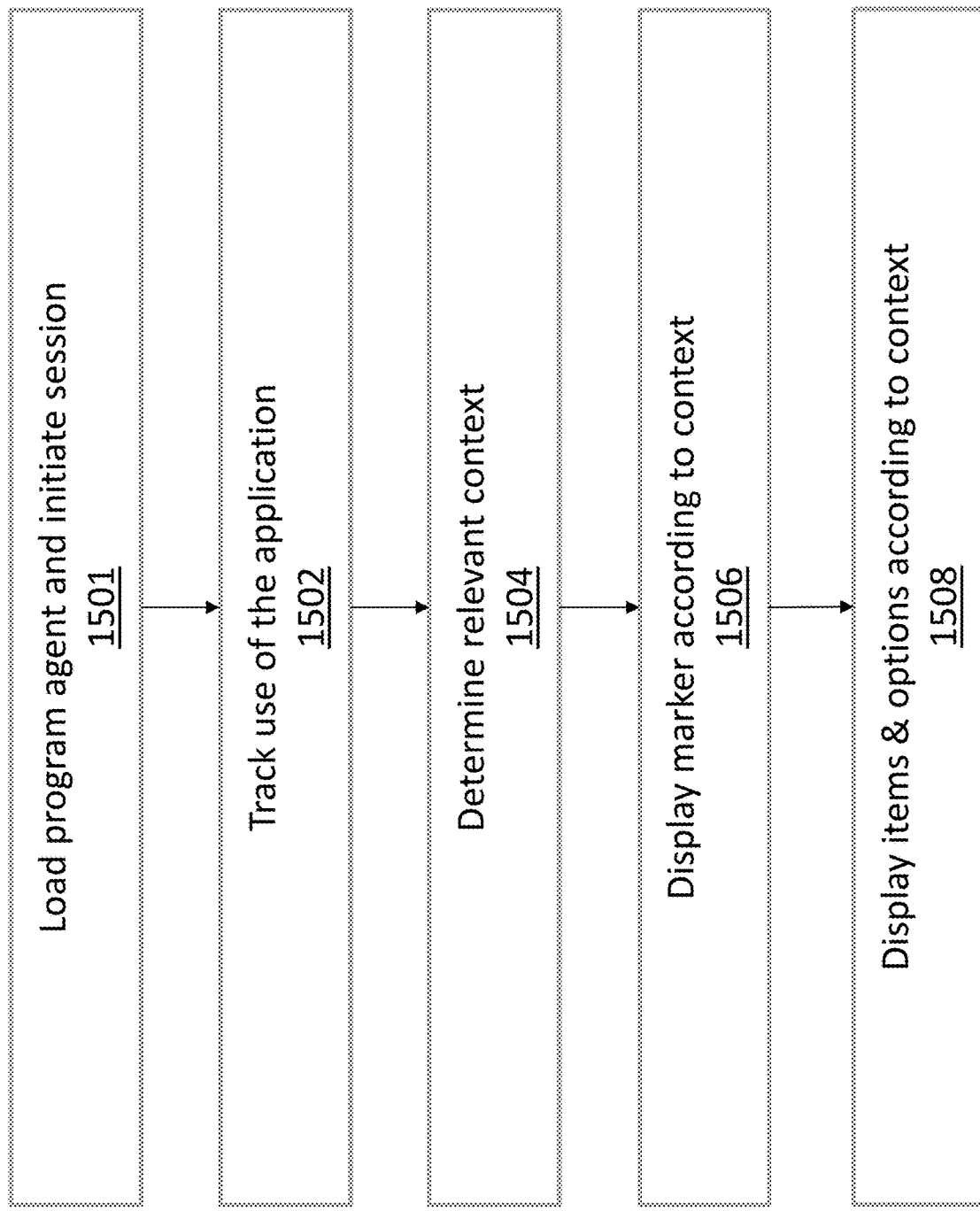
FIG. 15 is an example sequence of operation of the context aware repository for IT purposes.

The system could work according to the sequence of steps illustrated in FIG. 15 where at step 1501 a session between a client computer and the server of the system could be initiated once the client computer loads software which contains the system's agent 1418 as an API. The user and usage of the SW could then be tracked 1502, the context could then be determined by the KM at step 1504. A display marker in the form of, for example, a "GO" icon 1204 could be displayed at step 1506. The actions 1216 and content items 1218-1224 of "pop-up window" 1212 could then be determined at step 1508.

Figure 18:
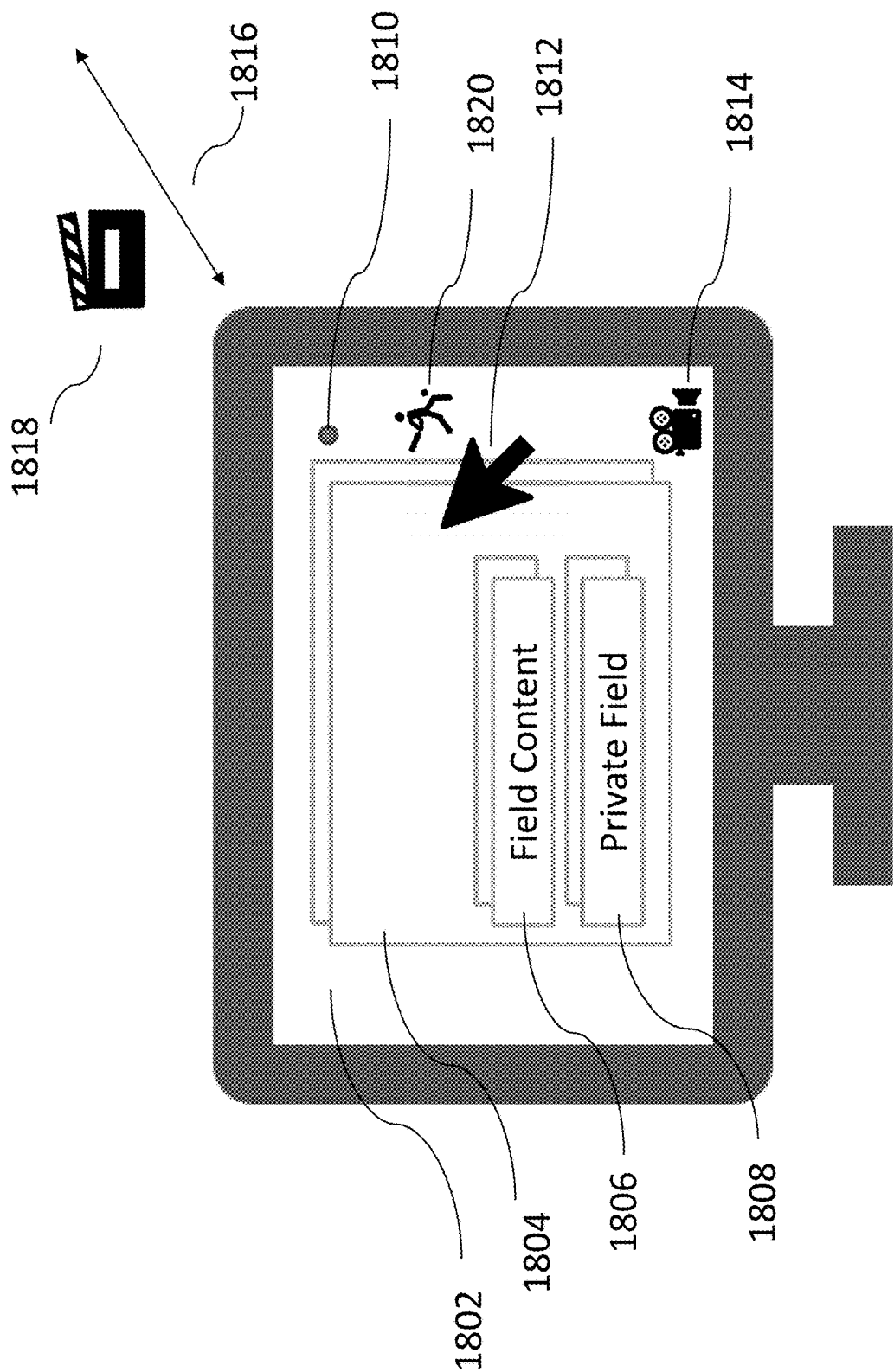
FIGS. 18 and 19 are example illustrations of a possible interface.

Creation of new screen recordings items 1412 could be made through the system using an embedded screen recording feature. FIG. 18 illustrates a screen recording system of various techniques. The result of such recording system could be a video of a sequence of actions and interactions with a specific SW. In case the SW is a runtime application, the screen could be recorded, in full 1802 or the only an application window 1804, using another runtime program 1814 that captures device's screen or window and records to a video file of known type 1818. In the case of cloud software (SaaS) the screen could be recorded using known latest HTML and JavaScript techniques to record the browser window's 1804 contents or portions of it to a video file of known type 1814. The recording could be started and ended on user request, upon system's suggestion, or without notice, and could request the user at the end to provide a title and description for the recording. The video can then be transmitted to the server over network 1816 and handled by the KM along with its contexts.

In another embodiment the recording could span over several different SW screens or webpages and the recorded video could be then related to these plurality of SE screens or webpages. For example a video recording of total of 1 minute could be related to page A from 0 seconds-20 seconds, to page B from 20 s-30 s, and to page C from 30 s-60 s. In the case of a macro recording spanning over 3 screens it could be that the operations of screen A relate to screen A, and so on.

Another method to create a screen recording using another type of an embedded feature could be recording the location of the mouse cursor 1812 at any given moment and capturing the contents of the SW window 1804 as a graphic and reproducing a screen video using this information. For example producing a video file made from capturing the content of the website as a background and producing an animation of movement of the mouse cursor 1812 between different locations that it was moved through by the user and producing animations of mouse clicks wherever the user clicked. In another variation the content of the page could be reproduced using an HTML structure of the page in case of a webpage. In such case contents of recognized private fields 1808, all fields with custom user inserted content 1806, or all fields with text could be made invisible in the final produced video in order to protect users' privacy.

In another variation of the video recording system the video can be sent to the server after being produced 1818 and the server could perform an Optical Character Recognition (OCR) or other type of computer vision processing to recognize text areas and make them blurry to protect their contents. In another variation the server could recognize the contents using the mentioned techniques to categorize the content of these videos for enhanced indexing of their contents. In another variation the video could also be edited using an online in-browser video editor with features such as make areas covered by boxes, blurry, add text labels, cut parts of the video timeline, and add voice over using microphone or uploaded audio file. The system could also change the pitch and other sound characteristics of the recorded voice.

Another type of recording of the user's actions could be through a macro. A macro could record the location of the mouse cursor 1812 and the user typed characters as part of the user's interactions with the SW as a sequence of operations. This macro can later be used as a "script" for operations to be repeated by the computer or device. The operations could be recorded either by the position of the mouse cursor in x,y position and the character typed as part of the sequence of operations. For example, 1. Moved from 121, 465 to 452, 744, 2. clicked at 452, 744, 2. Typed JohnDoe123, 3. Moved from 452, 744 to 788,354, 4. clicked at 788,354.

Another way could be to correlate the interactions with IDs of elements on the screen such as in the case of a webpage their various ID. For example, 1. clicked on field of ID username with the mouse, 2. Typed JohnDoe123, 3. Clicked button ID submit. Such a recording could then be played as a running macro to replicate the sequence of operations.

Another option is to keep the macro system recording at an always-on state in order to produce functions, for example, such as a "quick re-do" function. Such a function could allow the user to replicate the last actions any number of times with several clicks. The user could click at any time on the "quick re-do" icon 1820 and a popup window could show all the previous actions the user has made. The user could then choose which actions to repeat. For example, after clicking "quick re-do" 1820 a window displays sequence: 1. clicked on field of ID price with the mouse, 2. Typed 4.99, 3. Clicked button ID next, 4. Clicked button ID submit, which was performed by user prior to clicking 1820, the user then could choose, repeat 1-3. This could be made using a keyboard shortcut such as Ctrl+R, or could be even specified with the number of times to perform sequence 1-3.

Several factors could be assessed and shown for a user of the system. The level of the user could be determined according to the detected level of proficiency in a SW and shown on a predefined absolute scale or a scale relative the other users of the SW or of a group of interest. A measure of tracked improvement of the software use over time could also be shown on a scale and could also be predefined with suggestions or words of encouragement that could be shown to the user, added to the user's title in the SW or shared over the network. The level of a user could also be determined by the contributions to others through the system, for example, if the user shared a video or a macro that was used many times or received many "votes" or "likes". Furthermore, this grading system could be connected to an external program to provide data for users or employee encouragement programs where users can earn points to receive credits, gifts or other goods. Another option is to show relevant information about the current page of a SW such as number of users, last activity, average activity on page in terms of time or number of users on page. Another option is to embed icons 1212-1216 on the "GO" icon 1204 to mark a user as a "good contributor" with an award icon 1216, etc. Or, mark a page as "hazardous" if many users make a mistake on that page with "road hazard" icon 1220 that could be determined by KM and IA as described earlier.

In another inventive embodiment of this system the pop-up window 1212 could appear on a user's mobile device using an application of the system such that the contents of the window with suggestions could show up and be accessed from a mobile device. The correlation between the desktop client device and mobile device could be, for example, in the form of a username and password accessing the SW from the desktop and mobile at the same time, or a QR code to scan with the mobile device camera from the desktop, or other communication and authentication means.

In another inventive embodiment of this system the repository system 1410 could be managed on a $3^{rd}$ party solution such as a Knowledge Management System, like Microsoft SharePoint using an Application Programming Interface to connect between the systems.

In another embodiment of this system the colors of the popup window could be learned from, and applied automatically to, the SW it is intended to "run-in" using, for example, the HTML color codes of the 5 most frequently used colors of the SW. These frequent colors could also be used to produce a list of suggested color variations to be displayed to the system administrator of the SW to choose from, as part of a software utility for controlling the appearance of the popup windows, and where that system administrator could decide which variation to display to the software users.

Figure 19:
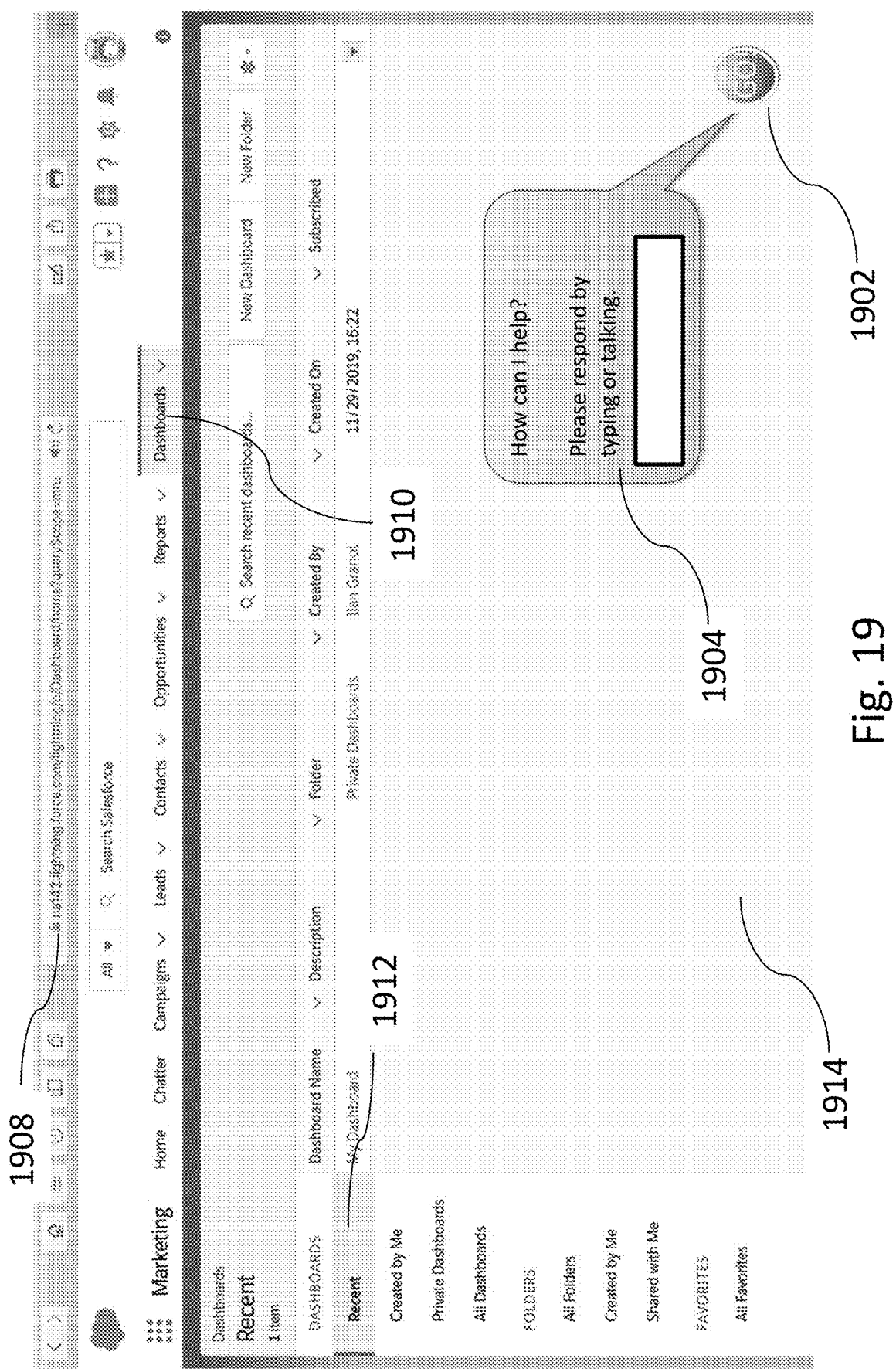

In another inventive embodiment the system's Intelligent Agent "IA" 1422 that is responsible for inference as discussed earlier, could comprise a Natural Language Processing model as used in Machine Learning and Deep Learning to be fed with help documents in a text format such as PDF such that "IA" 1422 comprised with NLP could process the help document where titles and larger or distinct text elements, for example, underlined text, larger sized (font) text, different color or font text could be considered as of greater significance for search, information retrieval, and information correlation purposes. For example, in FIG. 19, the "GO" button pops up conversation bubble 1904 offering help and the user could type, or talk in his voice to the microphone, a subject the user is looking for help with. The IA could correlate the current SW screen or webpage 1908, 1910, 1912, and 1914 that the user is accessing right now as the UC 1304 and could return results according to correlating: a. user's input, b. help document content analysis, c. UC. Furthermore, the result could be provided and displayed to the user in a "Bite Size"—meaning, the amount of text information could be limited to a predefined size to be easily readable and so not to overwhelm the user with information, for example, only the first paragraph of the result, and could include a "more . . . " button to access more information if desired by the user.

Clicking on the "GO" icon 1204 at any point in time could open the pop-up 1212 with items ordered by relevancy according to the correlation between the Use Context 1304 of the items at creation time and the current Use Context 1304 of the user that is using the SW. A secondary factor could be the Item's Context 1602. Thus, for example, a video (item 1412) which was created on a certain program 1306, on a certain page/screen 1308, with laptop of certain type 1312 could be more relevant to a user (using a device 1404) with the same or highly related attributes 1306, 1308, 1312. An example for a method to achieve such correlation could be the technique known as a recommendation engine.

Another option to get help from the system is using a mobile device with an App (application) which recognizes either a device or model and connects to a repository of IT information regarding that device or model. For example, a person who uses the App can point his mobile phone camera on his specific printer and the image could be sent to the server for an image recognition operation to search for IT knowledge which relates to such printer. Furthermore, the recognition feature could also detect an error message on the printer screen, for example, and further provide more specific IT help information in regard to that. Another example could be that a user of such an App points his mobile phone device to his computer screen which shows an error message on for example "Windows Operating System that his hard disk storage is almost full" and such message could be recognized by the server and the user could be sent to the appropriate related IT help information. It is also possible that such an App for mobile phone or for laptop or desktop devices could take a screenshot of the screen and send it to the server for such analysis.

An experienced user could also be categorized according to other factors in different contexts. For example, in the context of a shopping site (e-commerce shopping software) an experienced user could be defined as a shopping site user who spends more money than the average purchase amount among all shopping site users. A novice user could then be a user who spends less money in shopping.

An option for the tracking and categorizing of shoppers could be according to the outcome of their use of the shopping software. All users could be tracked, once their journey ends in a purchase totaling above average monetary value they could be categorized as experienced and their experience graph could be saved and be used to learn from, otherwise they could be considered novice users. For novice shoppers the system could show suggestions according to what was learned from experienced shoppers.

Another option for defining an experienced user could be in the context of a social network website (social software) where such a user could have a number of connections or friends, or receive social feedback (likes, mentions, positive intent and feedback) that is at or above the average. Such a user could be categorized by the system as experienced user. A novice user could then be someone who is below the average in a specific metric or group of metrics, for example, such as the number of friends in such social software ("SW"). For the users categorized as experienced their experience graph could be saved and learned from. For novice users they could be shown suggestions of how to use the social software according to what was learned from experienced users. The average number of connections or friends of that social network SW could be calculated, for example, by grouping all or some (randomly or by groups) of the SW users and calculating, at any moment in time, the average number of friends among all SW users. This could be done by summing the number of friends of all SW users and then dividing the sum by the number of SW users. In the case of the number of feedback responses, the average number of responses of that social network SW can be calculated by summing the average number of responses (which is the sum of all feedback to that user divided by the sum of that user's user-created content) each of the users have, and then dividing by the number of SW users. That type of feedback could also undergo intention analysis techniques to further calculate the averages of positive or negative feedback separately.

The use of the term "average" herein should be considered as a set threshold such as an arithmetic average but also if the threshold is set as the arithmetic median or geometric average or the to one third or other form a threshold which represents sub groups of better expertise as been demonstrated by the parameters presented herein, for example, such as, time spent to reach an end goal or any of the other parameters herein.

The groups of users of the social network SW that are used to calculate averages could be all of the social network's members, or they could have a more defining attribute in common. For example, they could be members from the same geographical area, with the same education level, or any other attribute that is an attribute that is shared among the social network SW users, like, occupation, language, gender, hobbies, etc.

Another option for defining an experienced user could be in the case of software for collaboration in a work or private setting. Such software emphasizes collaboration between people using various metrics, for example, such as, sharing information, providing feedback, communicating, influencing, etc. These activities could be related to measurements, for example, such as outreach which could be calculated by the number of people or users their actions reached, percentage of users their actions reached, and degree of connection reach (distance from node represents the collaborator in a graph network). According to these matrices a user that will have above average values could be considered experienced; otherwise, the user could be considered a novice. For the users categorized as experienced their experience graph could be saved and learned from. For novice users the system could show suggestions of how to use the collaboration software according to what was learned from experienced users.

We could calculate the "reach" of a user's activities by the degree of the connections that their activity has reached, for example, $1^{st}$ degree are direct connections, $2^{nd}$ degree are connections of $1^{st}$ degree connections, etc. The total reach of a user could then be compared to the average reach of all or some of the users of the SW to determine whether they are experienced (by being above average outreach), or novice (by being below average outreach), in that collaboration SW. The reach could also be calculated by summing all of the users that the user's content has reached, regardless of their degree, and comparing that value against the average of some or all users of the SW. For example, a user that created content that reached 3,213 users would be compared to the average reach of all users that could be 736 users, and thus, would be categorized as experienced.

The categorization of users as defined above could be determined in combination with techniques mentioned earlier such as the time involved in using any function of the SW. For example, it could also be the time it takes to complete a task where, in the context of, for example, shopping, that task could be completing a shopping session or transaction. It could also be in combination with tracking the user use of back function, scrolling, and requesting help as defined earlier. The categorization could use a combination of techniques using varied "weights" i.e. giving more emphasis to the money amount of the shopping transaction or to these said other factors. Also, in addition to the automatic learning of "end-goals" they could be determined by any sequence of operations that result in a desired action in these contexts. For example, in the context of shopping SW end-goal would be to complete a transaction. In the context of social media it could be to add a connection or friend, or to publish a "story", or "event", or "tweet".

Consequently, for such experienced users as mentioned above we could learn about their usage of the software and use it to provide guidance to their equivalent novice users. Such guidance could be in the form of on-screen suggestions as previously presented herein.

In another option of the proposed system, in subsequent sessions of users, i.e. users who have used the software before and were categorized, they could be shown suggestions early in their journey of the software use in case they were categorized as novice. If the users were previously categorized as experienced they could be shown suggestions as defined hereafter. The prior knowledge about users could be kept (persisted) in the form previously presented herein (keeping their user ID or username in a list, using cookies, etc.).

In another embodiment the following factors could be used to determine whether users are considered experienced users or novice users. In a learning management software "experienced" could be students with good grades. In management software it could be the seniority of an employee and/or title and/or salary/compensation, and/or placement in an organizational chart. In computer games it could be by the users' scores in the game software. Specifically, the grades of a student could be a number out of a total score that could be stored in a system such as in the case of a Learning Management System. Seniority of an employee could be for example whether the user is a manager or is an associate in the company, or the employee's rank in the company starting from the CEO as number 1 (most important) to some junior level N (least important) when using a SW like Human Resource Management System. A score in a computer game could be in the form of a number as most computer games store scores compared to a "Best Scores" list. In other situation users could be referred to a custom made test to determine their level of knowledge in the SW. Another option could be to simply ask the users to estimate and indicate their own level of experience in the SW as experienced or novice, or on a scale, indicate their experience in terms of the amount of time they spent on the software, or otherwise.

In another embodiment the mentioned calculations of comparing users to an average to determine categorization could be replaced by setting a value manually to determine who is "experienced" in any situation as a fixed number, a threshold, a set of discrete or real values to create a more detailed spectrum of defining novice vs experience, or applying a mathematical or statistical function. An example of a statistical function to use in such cases could be a Poisson distribution. The Poisson distribution is a technique used in the field of statistics to calculate the probability of events in which their occurrences are related to time. In our case we could expect that the users of a software would most probably interact with the software within a certain "learned" window of time where the probability is reduced as more time passes once "outside" that time window.

Figure 21:
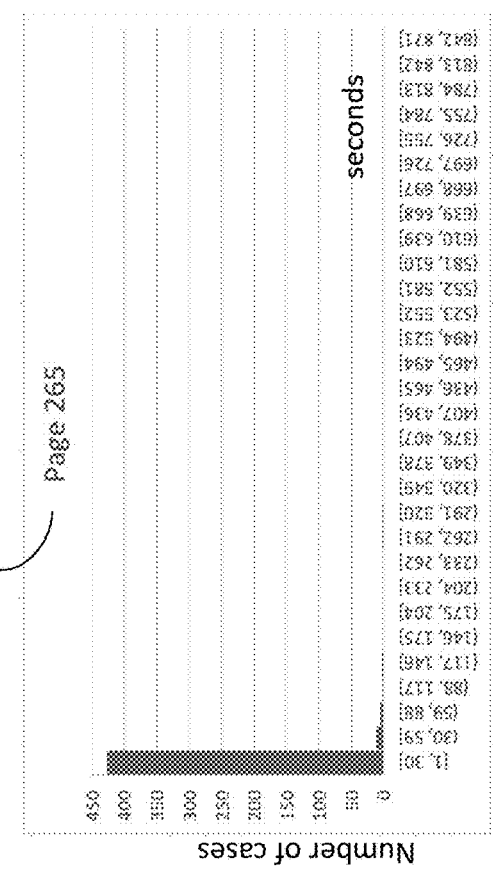
FIG. 21 is an example illustration of a probability distribution of user interactions in terms of time.
Figure 21:
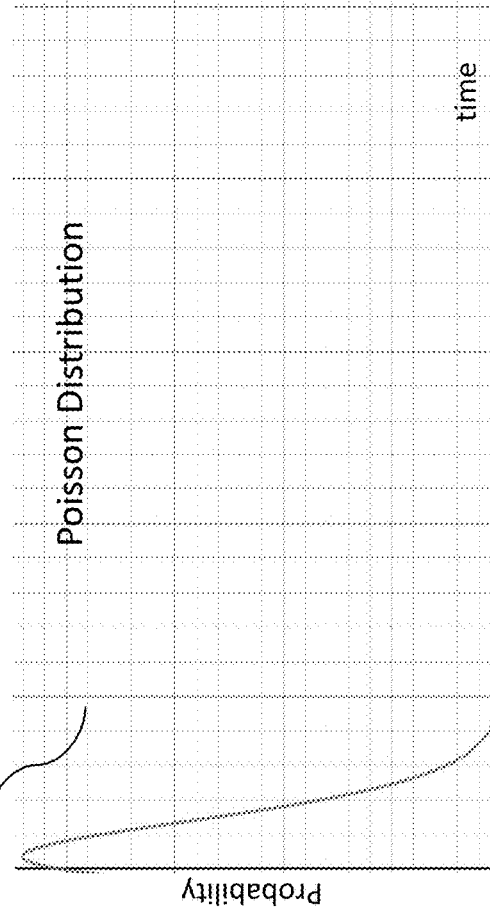
Figure 21:
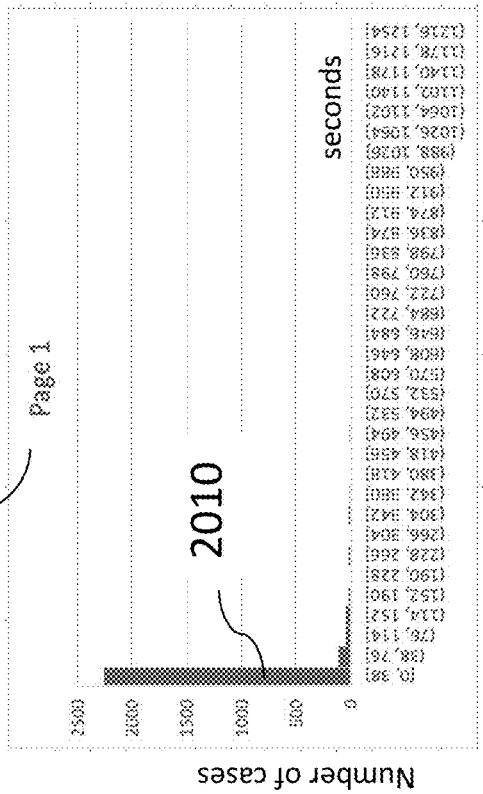
Figure 21:
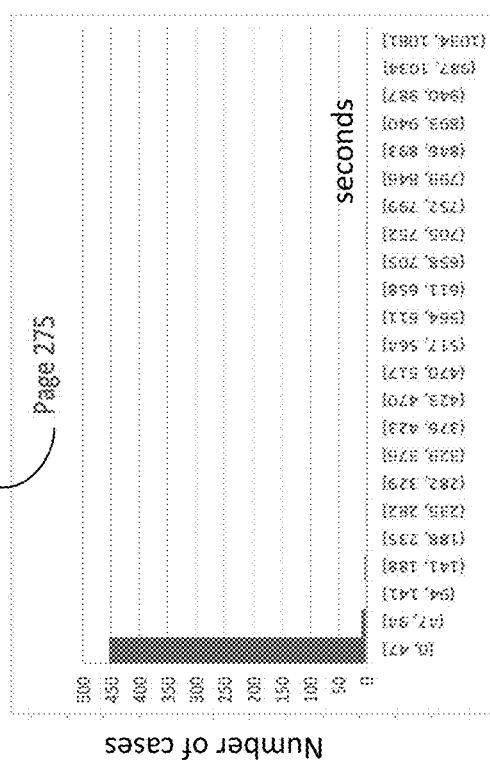

FIG. 21 shows three graphs of measured transition times between four SW screens of student "users" while using a learning management system software ("Canvas LMS"). Each of the three graphs 2102, 2104, 2106 show the amount of users who clicked (y-axis), in order to get to any next screen (in this case that we measured one click caused a transition to the next screen), within a certain time window in seconds (x-axis). We can see that the majority of the users clicked within some minimal certain time window as in any of these three graphs the left-most bar is most significant in terms of the number of occurrences. For example, the left most bar (2110) of Page 1 (2102) shows that there were about 2,300 cases where users clicked an option from Page 1 within a time window of between 0 and 38 seconds. Page 265 (2104) and Page 275 (2106) show the same kind of distribution of a left-most significant bar. This distribution is in accordance to a variation of the Poisson distribution (2108) which describes the probability of an event to occur as a function of the time that passes.

In another inventive embodiment we could employ user segmentation to "prune" the data that is related to some users in order to reduce the total amount of data consequently and to achieve computation efficiency. This is efficient to use in Frequent Pattern Mining algorithms in the field of Web Usage Mining ("WUM") since the technique for mining frequent patterns of WUM is very costly in computation because of its complexity. Reducing the amount of data could be helpful to make this process more effective. Therefore, removing a group of users, for example the novice users from the EG could reduce the computation time of finding frequent patterns of WUM.

In another inventive embodiment we could categorize users as novice or experienced according to the proportion of the extent of use of the software. The extent of use could be according to the ratio of each user's usage of functions from said "end-goals". Thus, we could categorize users that used more functions of the set of all software functions, on average, as experienced or novice otherwise. For example, in a software that has a set of 5 functions <A,B,C,D,E> and where the average number of different functions from that set that users do to completion (reach "end-goal") is 3 then any user who do to completion any 3 or more of different functions from that set could be considered experienced. Otherwise, they could be considered novice.

In another embodiment it is possible to use the proportion of the extent of use of the software discussed above as way to improve either novice or experienced users. This could be done by providing them with suggestions from the total set of software functions of said "end-goals". For example, in a software that has a set of 5 functions <A,B,C,D,E> a user that is either novice or experienced, and is known to use (from its Experience Graph) only functions A,B,D could be offered with suggestion of the functions they haven't used yet, i.e. C and E.

In another embodiment it is possible to learn (infer) a software's or a website's structure in terms of functionality by categorizing the webpages or software screens into transitional and goals/"end-goals". This could be achieved by analyzing the navigation paths of the experienced users, and categorizing the pages or screens they visited into transitional and end-goals. The categorization of pages could be according to the time experienced users spent on them. If the average time spent by all experienced users is shorter than the average time spent of all pages (sum of time spent on all pages by experienced users divided by number of pages) then it could be considered a transitional page. Pages that the average time spent on them by experienced users is above the average time spent-on of the pages could be considered end-goals. Another option could be to manually set a value for a time which will meet the above rules instead of the calculated, the mentioned averages, or to use thresholds for the transitional and end goals times, or to define a set of rules or functions in terms of time spent on a set of pages.

An example could be in a news website navigating from the "home page" to the "World" section and then to "Africa" and then looking for and navigating to a specific article about Africa could be transitional pages since the time spent on each page in that navigation is shorter on average, while reading that article could take more time, thus the time spent on that page on average would be longer. Another example could be in a learning management software, where navigating from the main screen to the a "business marketing course" and then to "homework" and then choosing the most recent homework could be transitional pages, and then reading the current homework page could take longer on average thus categorized as an end-goal.

In another embodiment it is possible to learn (infer) a software's or a website's ("SW") structure in terms of functionality by the common elements between webpages or screens of the SW. A SW that contains a set of elements that is the same among these screens could be of importance and therefore could be given a higher importance or emphasis in our learning process. For example, the main menu of software or website is usually repeated on all screens of the software, consequently, in our learning, giving emphasis to the navigation of experienced users in a main menu could be beneficial in some software where the main menu could contain functions with higher importance. We could then mark a higher weight in the experience graph "EG" for the actions that are related to the functionalities of these elements whenever we track the use of experienced users. Consequently, we could give these learned actions a higher ranking in the order of suggestions for novice users. For example, if many experienced users performed an action A by clicking an element that is "unique" (appears only on one of the screens or webpages of the SW), but also performed an action B that is an element of a main-menu (i.e. B is common to many or all of the webpages or screens of the SW), then B could show before A in the order of the list of suggestions, thus as more important and/or more relevant.

Another option is to be able to detect (infer) a change in the behavior of users. The benefit of such detection could be for information security or error tracking purposes. For example, a change in behavior of a user or a number of users could indicate that a hacker is currently attempting to breach the security of the software ("hack"). Another example could be that the current software has an undesired behavior ("bug") due to known or unknown reasons (underlying failure, programming error, user interface error, software change/update, platform change, hardware change, etc). In order to detect such "hack" or "bug" situations we could apply a mechanism to detect a change in the behavior of the users. This can be done by comparing prior knowledge ("history") about the users of the software or website with the current or newly learned behavior. This learning could be calculated and the detection could be applied to the SW as a whole or to each screen or function independently. Specifically, such detection could be achieved by comparing the ratio of novice users vs. experience users in the history (past data). For example, a sudden change (say >5%) rise of experienced users in the ratio of the experienced users vs.

the novice users (where the proportion of novice users will of-course drop accordingly since it is a ratio) in comparison to the average proportions of the previous days could indicate that a large group of "bots" (computer-made artificial users) are flocking the website in a "hack" attack. A contrary example could be a sudden change (say >5%) rise of experienced users in the ratio of the experienced users vs. the novice users (where the novice users proportion will of-course drop accordingly since it is a ratio) in comparison to the average proportions of the previous days could indicate that a function is currently malfunctioning.

Figure 20A:
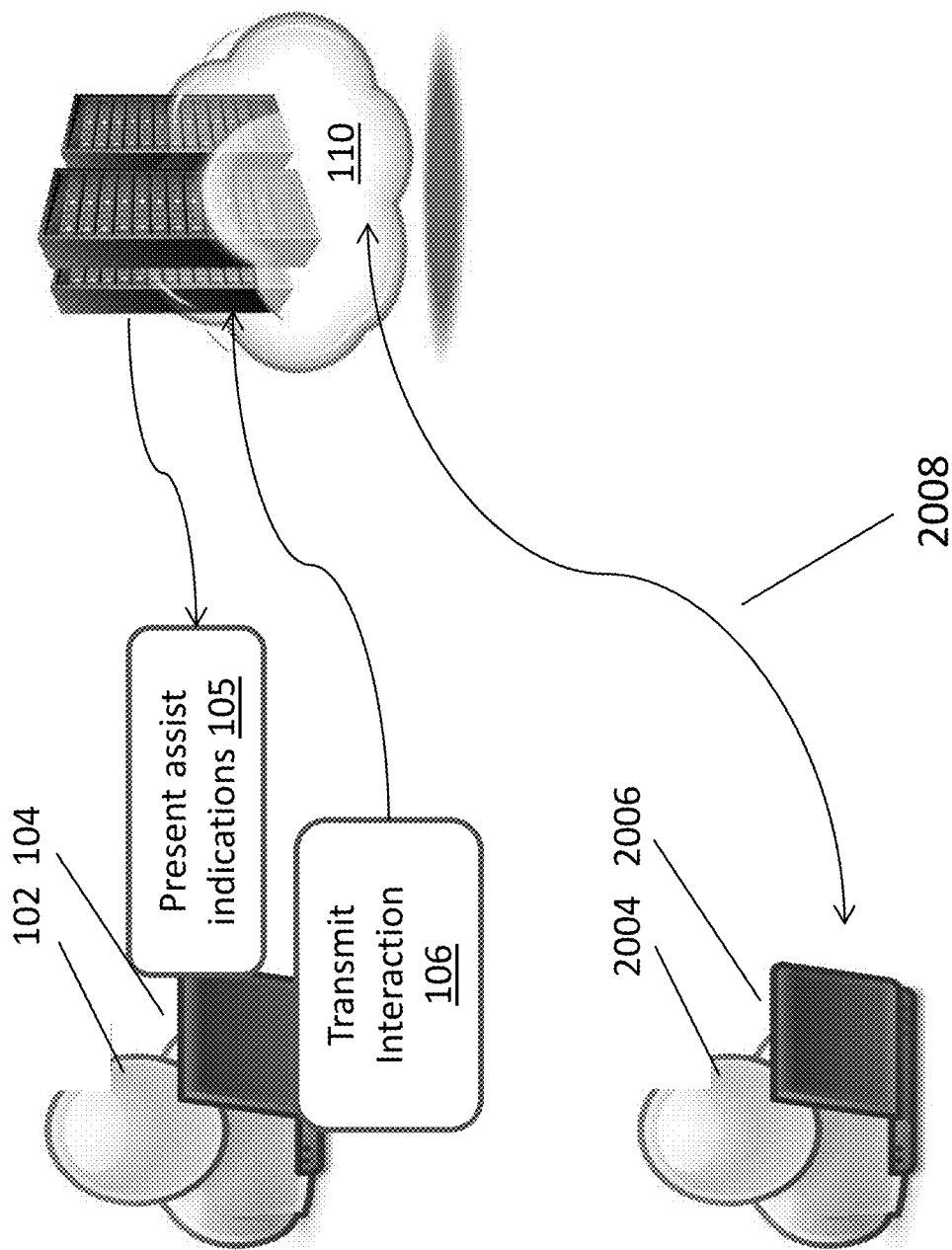
Figure 20B:
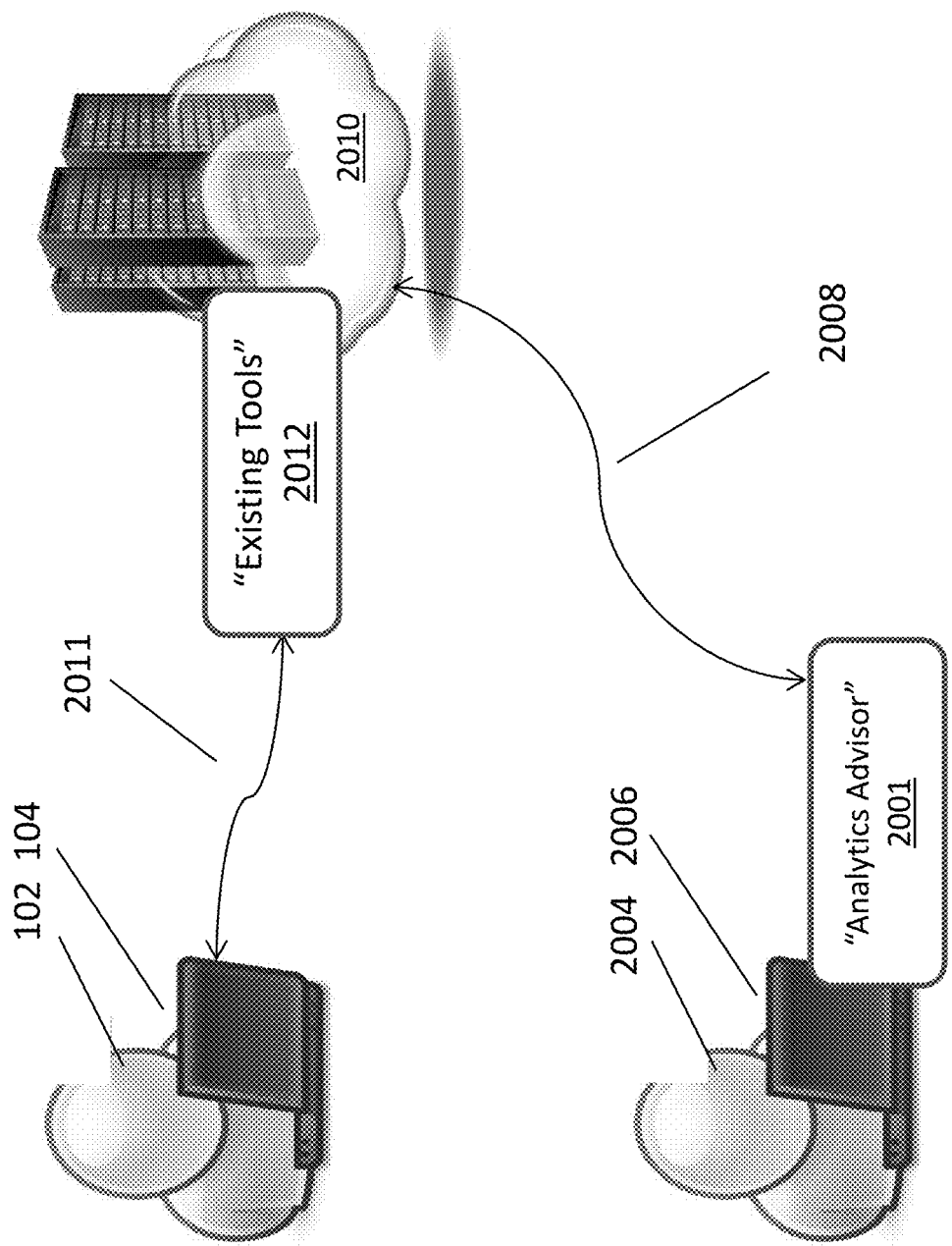

In another embodiment the system could be used in order to gather information about the behavior of users, or to act upon that information, in combination with other existing software tools in a process of "Analytics". As shown in FIG. 20A "Analytics" could be part of a system with the elements 102, 104, 105, 106, and 110 that are the same as in FIG. 1. and where it could be accessed by "Software Personnel" 2004, which could be, Software Engineers, Data Scientists, Product Managers and Designers, etc. using "Local machine 2006" and an "Interface Connection" 2008 (i.e. "API").

Another option, as shown in FIG. 20A, for performing "Analytics" is by connecting to a "SW Facility" 2010 which captures and stores user interaction and communicates with users by using "Existing Tools" 2012 from the users through "Network Connection" 2011. In here the "Analytics" operations could be made by "Software Personnel" 2004 by using "Analytics Advisor" tool that is on their "Local Machine 2006". This "Analytics Advisor" 2001 replaces the "Advisor" 110 of FIG. 1.

Another option, as shown in FIG. 20C, for performing "Analytics" is where there is an "Intermediate Facility" 2020 that comprises "Analytics Advisor" 2001 and that could be accessed through "Interface Connection" 2008. The "Analytics Advisor" 2001 could then be used to access information from the "SW Facility" 2010 that comprise with "Existing Tools" 2012 in order to be used during that connection session or could be programmed to keep a steady connection, or run periodical connection to transfer data and instructions with "SW Facility" 2010.

In "Analytics" instead of showing suggestions, as the present assist 105 of FIG. 20A does, to the users of the SW the suggestions and information about the usage of the SW could be requested by, or submitted to, a "Software Personnel" 2004 or "Intermediate Facility" 2020, through an "Interface Connection" 2008. The "Software Personnel" could then act according to that information using their other work tools or they could design or employ an "Interconnected System" to act upon the information received from our system. The information could be getting lists of suggestions, getting the EG, getting the list of users in any category (i.e. experienced, novice, etc.), the lists of users of any category, list of end-goals, and acting upon the information could be to create or change, approving or disapproving that information. The information could be accessed through the interface connection 2008 that could be accessed (request from or respond to) by an external destination.

The external destination could be read by software personnel to learn about the usage of their software and could be used to take decisions about improving the SW as part of software development or could also be used to automate learning from the SW usage. It could also be used to develop software that will automatically act according to the usage data read through that destination. Any of the functionalities mentioned herein could then be accessed through that destination.

For example, the software could produce a list of places in the SW where the users are "getting stuck", or where they don't complete their "end-goals" as "exit points" in order to notify of problems in the SW. Here "getting stuck" could be pages where the proportion of the experience users vs. novice users is relatively higher than other pages. For example, if most pages have around 80% vs 20% ratio (experienced vs. novice) categorization of users (according to their usage) and some page will have a 60% vs. 40% ratio then that page could be marked as "exit point". Also, if a sequence of pages are known to be leading to some known "end-goal" and in that sequence there are pages that many users stop their operation and "exit" that sequence without completing the sequence until that "end-goal" that sequence of pages could be marked as "exit points".

"Existing Tools" 2012 herein could replace, for example, the tracking of the SW users 106 in FIG. 20A. In this case the data about the usage of users of a SW could be collected using an event streaming software, put into a repository and then analyzed using "Analytics" to find interesting behaviors that are common to the users. These existing tools could be, but not limited to, software and tools for databases (RDBMS or NoSQL), data warehouse, data lake, data lake house, data or software repository, data ingesting, data streaming and event streaming (like "Kafka"), user tracking, extract-transform-load (ETL), online analytical processing (OLAP), online transactional processing (OLTP), data mining, and data science ("Data Science").

In here the use of some terms could be consider in a broader meaning and include similar terms without specifically name them. Artisan in the art could adapt the techniques presented here to these alternative devices. For example the terms mouse and keyboard could represent in general user tools for interacting with computing system. These terms could reference other input means such as touch screen, stylus pen, and joystick. The computing system could be tablet or Smartphone. While the user interact with the computing system using these input device and watching the display screen, the software (SW), the Transmit interaction 106 and the present assist 105 could be running on the user device, on the internet as a web page with some server support in the background, on a server as part of a non-web multi user system, on a cloud server, as an SDK to help in the development of, as a service that is accessed through an API or other software interface, and to be bundled with, other applications made with a programming language like for example Java, and any combination of such. Similarly the Advisor 110 could be resident in the cloud server or any other form of system set up enabling the implementation of the techniques presented here.

It could also be appreciated by persons of ordinary skill in the art that the invention is not limited to what has been particularly shown and described hereinabove. For example, drawings or illustrations may not show details of UI Advisor 110 construction or design for clarity in illustration. Further, combinations and sub-combinations of the various features described hereinabove may be utilized. Rather, the scope of the invention includes both combinations and sub-combinations of the various features described hereinabove as well as modifications and variations which could occur to such skilled persons upon reading the foregoing description.

We claim:

1. A server system, the server system comprising:
a memory processor comprising memory;
a communication link,
    wherein said memory comprises a plurality of prior shoppers interface experience records, and wherein each of said prior shoppers interface experience records represent a shoppers interaction with a plurality of shopping interface screens of a shopping tool;
a first program designed to categorize shoppers interface experience into at least two groups,
   wherein said at least two groups comprise an experienced shoppers group and an inexperienced shoppers group,
   wherein said experienced shoppers group comprises individual experienced shoppers, and
   wherein each one of said individual experienced shoppers demonstrates a better than average proficiency of said shopping tool;
a second program designed to construct a shopper interface experience graph from said experienced shoppers group's interface experience with said shopping tool; and
a third program designed to use said shopper interface experience graph to communicate suggestion notes to at least one shopper of said shopping tool,
   wherein said suggestion notes are designed to help said at least one shoppers interface with said shopping tool.

2. The server system according to claim 1,
wherein said categorize utilizes a time attribute to complete transactions associated with said shoppers interface experience.

3. The server system according to claim 1,
wherein said second program is designed to construct a list of popular shoppers paths for said shopping tool from said plurality of prior shoppers interface experience records of interfacing with said shopping tool.

4. The server system according to claim 1,
wherein said inexperienced shoppers group interface experiences comprise a significant portion of said shoppers interface experiences.

5. The server system according to claim 1,
wherein said categorize utilizes a spending amount attribute associated with said shoppers interface experience.

6. The server system according to claim 1,
wherein said categorize utilizes scrolling up and down, or use of a help function, or navigating back and forth attributes associated with said shoppers interface experiences.

7. The server system according to claim 1,
wherein said first program is designed to form a list of experienced shoppers.

8. A server system, the server system comprising:
a memory processor comprising memory;
a communication link,
   wherein said memory comprises a plurality of prior user interface experience records, and
   wherein each of said prior user interface experience records represent a user interaction with a plurality of user interface screens of a social media site;
a first program designed to categorize user interface experience into at least two groups,
   wherein said at least two groups comprise an experienced users group and an inexperienced users group,
   wherein said experienced users group comprises individual experienced users, and
   wherein each one of said individual experienced users demonstrates a better than average proficiency of said user in said social media site;
a second program designed to construct a user interface experience graph from said experienced users group's interface experience with said social media site; and
a third program designed to use said user interface experience graph to communicate suggestion notes to at least one user of said social media site,
   wherein said suggestion notes are designed to help said at least one user interface with said social media site.

9. The server system according to claim 8,
wherein said second program is designed to construct a list of end-goals for said specific social media site from said plurality of prior user interface experience records with said specific social media site, and
   wherein said list of end-goals comprises at least one end-goal.

10. The server system according to claim 8,
wherein said second program is designed to construct a list of popular user paths for said specific social media site from said plurality of prior user interface experience records of interfacing with said specific social media site.

11. The server system according to claim 8,
wherein said inexperienced users group user interface experiences comprise a significant portion of said user interface experiences.

12. The server system according to claim 8,
wherein said categorize utilizes a time attribute associated with said user interface experience.

13. The server system according to claim 8,
wherein said categorize utilizes numbers of connection, or numbers of "likes" associated with said user for said social media site.

14. The server system according to claim 8,
wherein said first program is designed to form a list of experienced users.

15. A server system, the server system comprising:
a memory processor comprising memory;
a communication link,
   wherein said memory comprises a plurality of prior user interface experience records, and
   wherein each of said prior user interface experience records represent a user interaction with a plurality of user interface screens of a software tool;
a first program designed to categorize user interface experience into at least two groups,
   wherein said at least two groups comprise an experienced users group and an inexperienced users group,
   wherein said experienced users group comprises individual experienced users, and
   wherein each one of said individual experienced users demonstrates a better than average proficiency of said user software tool;
a second program designed to construct a user interface experience graph from said experienced users group's interface experience with said software tool; and
a third program designed to use said user interface experience graph to communicate analytics to at least one external destination,
   wherein said analytics are in respect to said experienced users group's interface experience with said software tool.

16. The server system according to claim 15,
wherein said second program is designed to construct a list of exit points for said specific software tool from said plurality of prior user interface experience records with said specific software tool.

17. The server system according to claim 15,
wherein said second program is designed to construct a list of popular user paths for said specific software tool from said plurality of prior user interface experience records of interfacing with said specific software tool.

18. The server system according to claim 15,
wherein said inexperienced users group user interface experiences comprises a significant portion of said user interface experiences.

19. The server system according to claim 15,
wherein said categorize utilizes a time attribute associated with said user interface experience.

20. The server system according to claim 15,
wherein said categorize utilizes scrolling up and down, or use of a help function, or navigating back and forth attributes associated with said user interface experiences.

* * * * *